United States Patent [19]

Danielsen

[11] 4,253,185
[45] Feb. 24, 1981

[54] METHOD OF TRANSMITTING BINARY INFORMATION USING 3 SIGNALS PER TIME SLOT

[75] Inventor: Daniel Danielsen, Wheaton, Ill.

[73] Assignee: Bell Telephone Laboratories, Incorporated, Murray Hill, N.J.

[21] Appl. No.: 57,179

[22] Filed: Jul. 13, 1979

[51] Int. Cl.³ .................................................. H04L 25/49
[52] U.S. Cl. ....................................... 375/20; 371/56; 375/110
[58] Field of Search .................. 371/53, 54, 55, 56; 360/41, 44; 375/17, 19, 20, 34, 110, 18, 113, 117; 340/347 DP; 370/100

[56] References Cited

U.S. PATENT DOCUMENTS

| | | | |
|---|---|---|---|
| 2,700,696 | 1/1955 | Barker | 455/102 |
| 2,759,047 | 8/1956 | Meacham | 375/17 |
| 2,996,578 | 8/1961 | Andrews | 178/70 |
| 3,057,962 | 10/1962 | Mann et al. | 375/113 |
| 3,133,280 | 5/1964 | Crater | 375/19 |
| 3,216,008 | 11/1965 | Goldhammer . | |
| 3,292,147 | 12/1966 | Dascotte | 371/32 |
| 3,302,193 | 1/1967 | Sipress | 340/347 |
| 3,369,229 | 2/1968 | Dorros | 340/347 |
| 3,403,377 | 9/1968 | Connolly et al. | 371/47 |
| 3,418,631 | 12/1968 | Sipress et al. | 371/56 |
| 3,502,810 | 3/1970 | Aaron et al. | 375/17 |
| 3,551,817 | 12/1970 | Kovar | 375/110 |
| 3,678,194 | 7/1972 | Orrell | 375/17 |
| 3,808,366 | 4/1974 | Wanamaker et al. | 375/36 |
| 3,988,676 | 10/1976 | Whang | 375/20 |
| 4,002,833 | 1/1977 | Eachus | 375/23 |
| 4,020,282 | 4/1977 | Halpern | 375/34 |
| 4,088,831 | 5/1978 | Butcher et al. | 375/110 |

*Primary Examiner*—Benedict V. Safourek
*Attorney, Agent, or Firm*—Sherman N. Turner

[57] ABSTRACT

A self-synchronizing transmission loop consists of a transceiver, a transponder, a data link for transmitting a group of eight binary numbers from the transceiver to the transponder, and a data link for transmitting a group of eight binary numbers from the transponder to the transceiver. Each of the transceiver and the transponder uses a bipolar return-to-zero direct-current signal format where each binary number to be transmitted has its own transmission time slot divided into three substantially equal successive time segments T1, T2 and T3. Time segment T1 provides a change from zero level to a single unit level signal of positive polarity (+1) for binary 1 and of negative polarity (−1) for binary 0, time segment T2 provides a reversal of the single unit level signal of time segment T1, and time segment T3 provides a change back to the zero level of signal. During time segment T3 for the last transmission time slot, the change of signal level is of the same polarity as during time segment T1 of that last time slot. After the start of transmission, each transmission by either the transceiver or the transponder of a successive time segment signal level change is initiated only upon receipt from the other of a corresponding time segment signal change.

28 Claims, 14 Drawing Figures

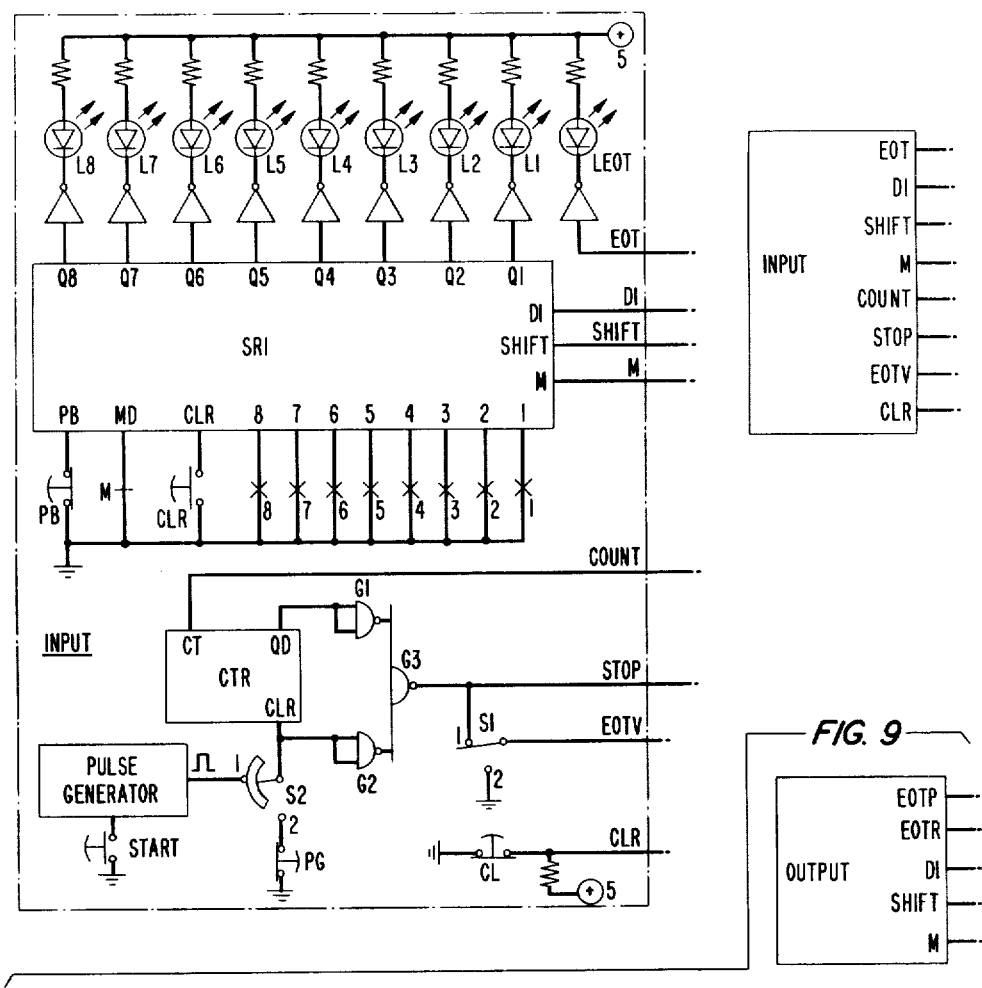
FIG. 8
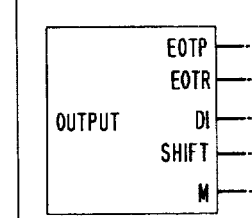
FIG. 9
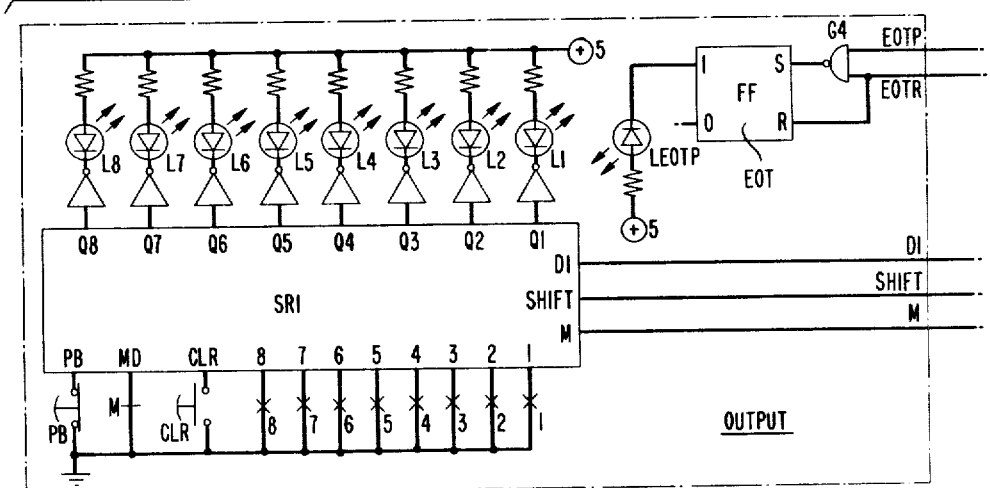

METHOD OF TRANSMITTING BINARY INFORMATION USING 3 SIGNALS PER TIME SLOT

TECHNICAL FIELD

The present invention relates to methods of transmitting binary information where each item of binary information is represented by a plurality of direct current signals transmitted during a transmission time slot for the item.

BACKGROUND OF THE INVENTION

The art of transmitting an item of binary information reduces itself to the transmission of one or more binary bits where each such binary bit represents either a single binary digit of "1" or a single binary digit of "0" and where the number and arrangement of such binary bits per item is determined by the binary number to be represented by each item.

The following U.S. Pat. Nos. are representative of the prior art where each binary bit is represented by a single direct current signal during a transmission time slot TS per bit and where a plurality of successive such time slots TS are required to represent a binary number consisting of more than one binary digit: 2,759,047 to L. A. Meacham of Aug. 14, 1956; 2,996,578 to F. T. Andrews, Jr. of Aug. 15, 1961; 3,057,962 to H. Mann et al. of Oct. 9, 1962; 3,133,280 to T. V. Crater of May 12, 1964; 3,302,193 to J. M. Sipress of Jan. 31, 1967; and 3,502,810 to M. R. Aaron et al. of Mar. 24, 1970. In such prior art, the single signal during each time slot TS is either a zero level signal, a single finite level signal of positive polarity (+) with respect to the zero level, or a single finite level signal of negative polarity (−) with respect to the zero level. In Meacham, + is used to represent binary 1 and − is used to represent binary 0; and, zero is used to represent consecutive 1s or 0s during a plurality of successive time slots TS. Andrews uses zero to represent binary 0 and either + or − to represent binary 1, the + and − being used alternately to represent consecutive 1s during a plurality of successive time slots TS. In Mann et al., the same scheme is used as in Andrews except that the end of a plurality of successive time slots TS is signified, in a time slot TS following the last time slot TS of the plurality, by the use of the same + or − as the last previous binary 1. Crater uses zero to represent binary 0 and either + or − to represent binary 1, the + being used if an even number (that is, 0, 2, 4, et cetera) of time slots TS occur since the last binary 1, and the − being used if an odd number (that is, 1, 3, 5, et cetera) of time slots TS occur since the last binary 1. In Sipress, binary 1 is represented by either + or − and binary 0 is represented by either +, − or zero, the choices being made over a plurality of successive time slots TS according to a coding scheme. Aaron et al. uses either +, − or zero to represent either binary 1 or binary 0, zero being used to represent binary 0 where less than four consecutive binary 0s occur during a plurality of successive time slots TS and where otherwise the choices are made over the plurality of successive time slots TS according to a coding scheme.

U.S. Pat. No. 4,002,833 to J. J. Eachus of Jan. 11, 1977 is another type of prior art wherein each binary bit is represented by a single direct current signal during a transmission time slot TS per bit and particularly wherein two bilevel signals are used such that any change of only one signal between levels represents a binary 1 or a binary 0 and a change between levels of both signals at the same time represents the end of a group of successive bits.

The following U.S. Pat. Nos. are representative of the prior art where each binary bit is represented by two successive direct current signals during two successive time segments T1 and T2 constituting a transmission time slot TS per bit (that is, TS=T1+T2) and where a plurality of successive such time slots TS are required to represent a binary number consisting of more than one binary digit: 2,700,696 to R. H. Barker of Jan. 25, 1955; 3,216,008 to F. R. Goldammer of Nov. 2, 1965; 3,403,377 to T. A. Connolly et al. of Sept. 24, 1968; 3,678,194 to I. F. Orrell, Jr. of July 18, 1972; and 3,808,366 to C. M. Wanamaker of Apr. 30, 1974. In Barker, Goldammer and Wanamaker each of the two signals during time segments T1 and T2 of time slot TS is either a zero level signal, a single positive (+) level signal, or a single negative (−) level signal. In Barker the signal during time segment T1 is zero to represent binary 0, the signal during time segment T2 is zero to signify the end of the time slot TS, and during a plurality of successive time slots TS the signal during time segment T1 is alternately + and − to represent successive binary 1s. Goldammer provides a + during time segment T1 as a synchronizing signal and provides respective − and zero during time segment T2 to represent respective binary 1 and binary 0. In Wanamaker, time segment T1 uses a − signal to represent binary 1 and a zero signal to represent binary 0. Connolly et al. uses only the two signal levels of + and zero, the time segment T1 signal being + to represent binary 1 and zero to represent binary 0 with the time segment T2 signal being the opposite of the time segment T1 signal. In Orrell the four signal levels of zero, +1, +2 and +3 are used, the time segment T1 signal being +2 as a synchronizing signal, the time segment T2 signal being +1 to represent binary 1 and zero to represent binary 0, and the time segment T1 following the time slot TS for the last of a plurality of successive time slots TS contains a +3 signal to signify the end of the plurality of time slots TS.

U.S. Pat. No. 3,369,229 to I. Dorros of Feb. 13, 1968 represents the prior art where a binary number consisting of more than one binary digit is represented by two successive direct current signals during two successive time segments T1 and T2 constituting a transmission time slot TS. Dorros uses the six signal levels of +5, +3, +1, −1, −3 and −5 one at a time during each of time segments T1 and T2 according to a coding scheme to represent various four binary digit numbers.

U.S. Pat. No. 3,292,147 to J. Dascotte of Dec. 13, 1966 represents the type of prior art where each binary bit of 1 and 0 is represented by three successive signals during three successive time segments T1, T2 and T3 constituting a transmission time slot TS per bit. In Dascotte, three different alternating current frequencies A, B and C are used with a different one of the three frequencies occurring during a different one of the time segments T1, T2 and T2 and with two different sequences of such occurrences representing the two values of binary 1 or binary 0. Specifically, for the sequence of time segments T1 to T2 to T3 any one of the sequences A to B to C, B to C to A and C to A to B represents binary 0 and any one of the sequences A to C to B, C to B to A and B to A to C represents binary 1.

U.S. Pat. No. 4,020,282 to P. H. Halpern of Apr. 26, 1977 represents the type of prior art where a binary number consisting of more than one binary digit is represented by more than two successive direct current signals during the same number of successive time segments constituting a transmission time slot TS. Halpern uses a time slot TS consisting of six time segments T1 through T6 and uses the two signals of + and − occurring during time segments T1 through T6 according to a coding scheme part of which requires that the six signals consist of three + and three − signals.

The large number of ways devised in the prior art for transmitting one or more binary bits reflects a continuing search for methods of transmission which can solve the many problems confronting the use of direct current signal formats. The following seven such problems are significant problems among perhaps others not mentioned: (1) the desirability of providing a signal format which reduces or eliminates the tendency for center-line-drift to occur; (2) the desirability of including synchronizing information in the signal format; (3) the desirability of providing a signal format which requires neither a time clock nor a time slot recovery means: (4) the desirability of providing a signal format which is repeatable by self-timed repeaters; (5) the desirability of providing a signal format which tolerates large variations in transmission bit rate; (6) the desirability of providing a signal format which includes end-of-item information and which includes end-of-group information where a group of items are transmitted; and, (7) the desirability of providing a signal format which permits a transmitted item of information to represent plural digit binary numbers and which permits a group of such items to be transmitted.

The above-cited examples of the prior art teach methods which solve one or more but not all of the foregoing problems.

SUMMARY OF THE INVENTION

The present invention solves all of the foregoing problems facing any method of transmitting an item of binary information where the item is represented by the occurrence of a plurality of direct current signals during a transmission time slot for the item and solves all of the foregoing problems facing any such method where a group of such items are involved.

The present invention solves the stated problems by providing such a method of transmitting an item of binary information characterized in that only three successive signals are transmitted during the transmission time slot for the item where the first signal represents the binary value of the item, the second signal represents a transition between the first signal and the third signal, and the third signal represents the end of the transmission time slot for the item.

The present invention solves the stated problems by providing such a method of transmitting a group of such items characterized in that the third signal also distinguishes the end of the transmission time slot for an initial item of the group from the end of the transmission time slot for the last item of the group.

Within the above general concept of the method of the present invention each signal in a more specific aspect is a change between different signal levels of a plural level signal format and each of the three successive signals for an item is different from the immediately preceding signal for the item. This arrangement embodies synchronizing information by virtue of the successive signal changes, thus precluding the necessity for the use of either a synchronizing clock or a time slot recovery means, rendering the signal format repeatable by self-timed repeaters, and accommodating large variations in item transmission rate. Also, the fact that the third signal is distinctive allows it not only to represent the end of an item transmission slot but also to distinguish the end of the time slot for an initial item of a group from the end of the time slot for the last item of a group.

More particularly, a specific aspect of the invention makes use of a signal format having a zero signal level and at least one finite signal level of each of two opposite polarities with respect to the zero signal level. Since each first signal represents all by itself the value of the transmitted item, the second signal can be such as to reduce or eliminate the tendency for center-line-drift to occur and the third signal can be such as to provide end-of-item and, where necessary, end-of-group information.

If it is desired to transmit an item of binary information where the item is a binary number of more than one binary digit, a particular aspect of the present invention readily allows such to take place by providing more than one finite level of each polarity of signal with respect to the zero level. The latter permits the first signal of each time slot to have a sufficient number of different magnitudes of change to represent plural binary digit numbers.

The present invention is specifically illustrated, as in the exemplary embodiment, by the use of a bipolar-return-to-zero signal format and by the use of three successive time segments T1, T2 and T3 constituting the transmission time slot TS (that is, TS=T1+T2+T3) for an item.

For transmitting an item of binary information where the item is a single binary digit of 1 or 0, the three signal levels of zero, +1 and −1 are used. The value signal during time segment T1 is a change from zero to +1 for an item of binary 1 and a change from zero to −1 for an item of binary 0 where the polarity (+ or −) of the signal represents the value of the item. The signal for the item during time segment T2 is a change from +1 to −1 for an item of binary 1 and a change from −1 to +1 for an item of binary 0. The signal for the item during time segment T3 is a change from −1 to zero for an item of binary 1 and a change from +1 to zero for an item of binary 0. Where a group of such items are to be transmitted, the signal for the last item during time segment T3 is a change from −1 to +1 for an item of binary 1 and a change from +1 to −1 for an item of binary 0.

For transmitting an item of binary information where the item is one of the double binary digit numbers of 00, 01, 10 and 11, the five signal levels of zero, +1, +2, −1 and −2 are used. The value signal during time segment T1 is −1 for 00, −2 for 01, +1 for 10 and +2 for 11 where the polarity (+ or −) of the signal represents the left-hand digit and the level (1 or 2) of the signal represents the right-hand digit. The signal for the item during time segment T2 is a change from the level of the polarity of the T1 signal to the same level of the opposite polarity. The signal for the item during time segment T3 is a change from the level of the T2 signal back to zero level. Where a group of such items are to be transmitted, the signal for the last item during time segment T3 is a change from the level of the T2 signal to one of the levels of the opposite polarity.

BRIEF DESCRIPTION OF THE DRAWING

The drawing consists of ten sheets showing FIGS. 1 through 14 generally described as follows:

FIG. 8 shows the details of the input circuit of FIGS. 1 and 4;

FIG. 9 shows the details of the output circuit of FIGS. 1 and 4;

DETAILED DESCRIPTION

Figure 2:
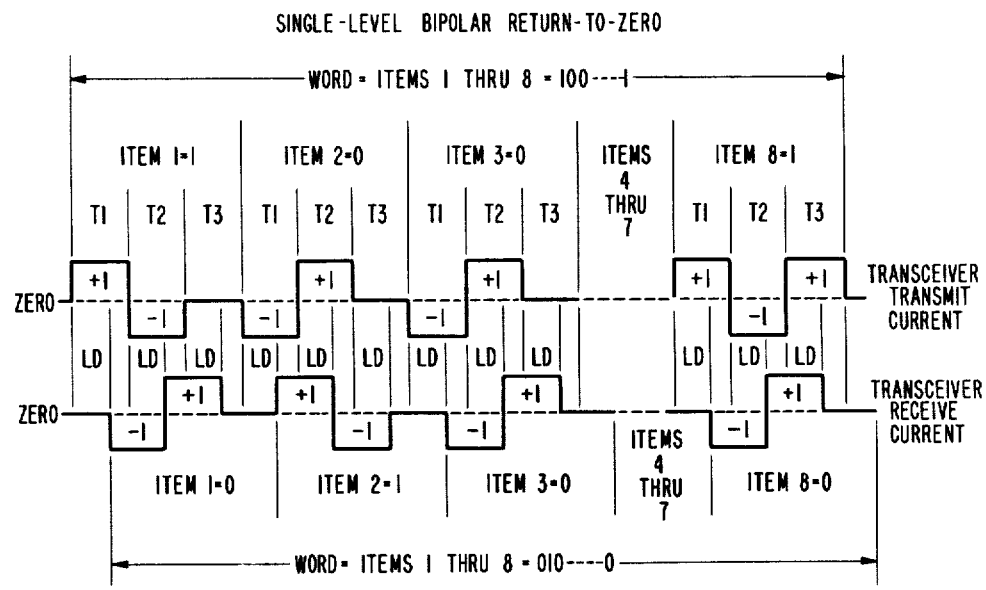
FIG. 2 is a diagram showing how a single-level bipolar return-to-zero direct current signal format may be used to represent the items of the 8-item word where each item is one of the single binary digit numbers of 0 and 1.
Figure 3:
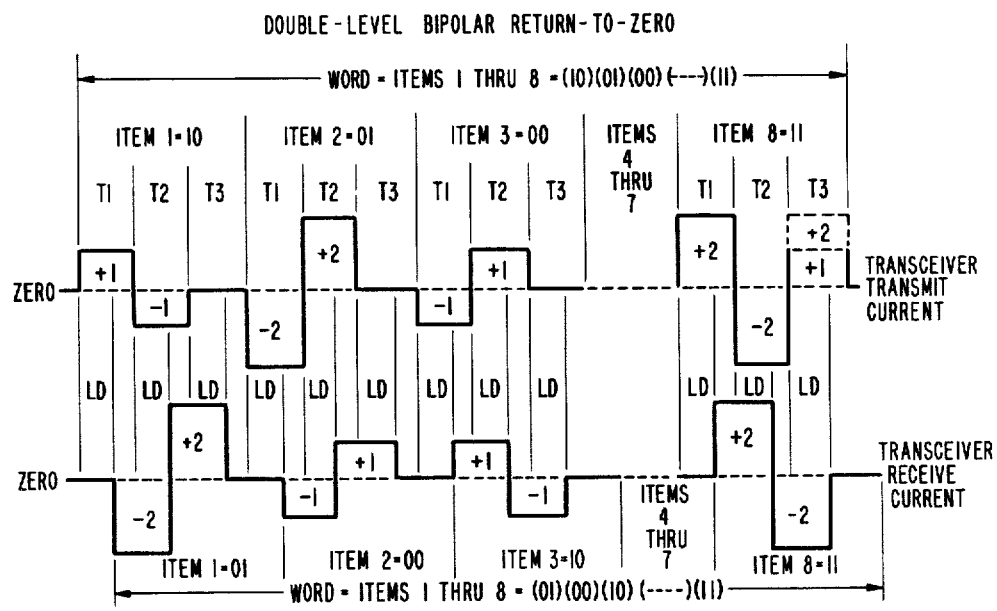
FIG. 3 is a diagram showing how a double-level bipolar return-to-zero direct current signal format may be used to represent the items of an 8-item word where each item is one of the double binary digit numbers of 00, 01, 10 and 11.

The detailed description to follow of the exemplary embodiment of the invention is arranged in the following order of subheadings: The Signal Format; Symbols and Circuit Conventions; Interconnection Diagram; Block Diagram; Input Circuit; Output Circuit; Data Loop; Transceiver; Transponder; Double-Level Signal Format; Modulator; and Demodulator. The Signal Format FIGS. 2 and 3 illustrate the characteristics of the bipolar return-to-zero direct current signal formats used in the exemplary disclosure. FIG. 2 shows a single-level format where three discrete signal states are used; namely, a zero level, one unit level of positive polarity with respect to the zero level, and one unit level of negative polarity with respect to the zero level. FIG. 3 shows a double-level format where five discrete signal states are used; namely, one and two unit levels of positive polarity, one and two unit levels of negative polarity, and a zero level.

Figure 1:
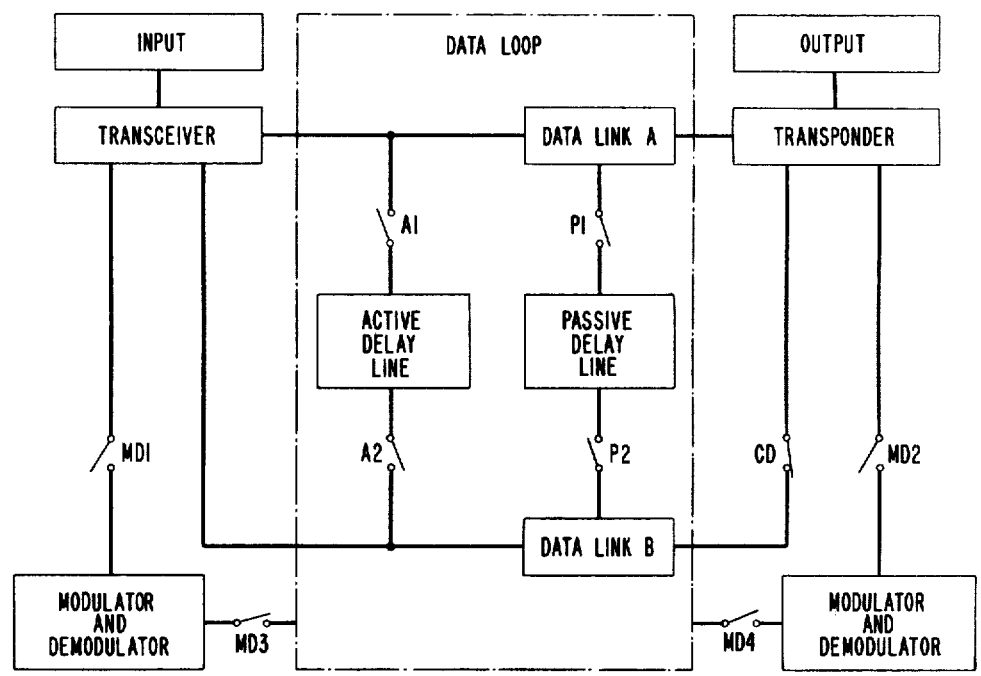
FIG. 1 is a block diagram showing the main functional relationships among the parts of a shef-synchronizing transmission loop.
Figure 4:
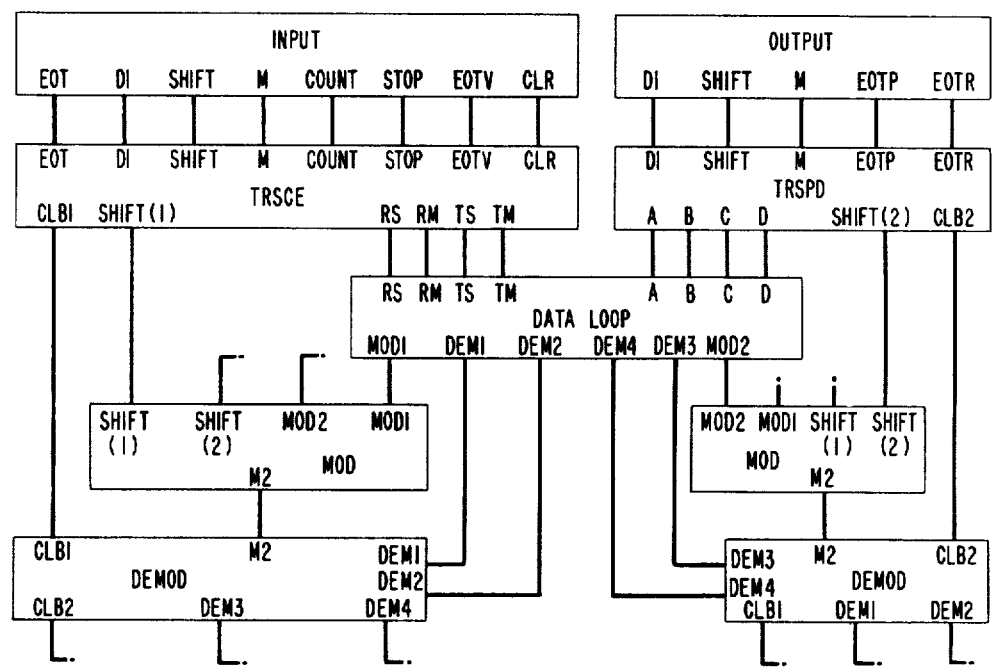
FIG. 4 is a diagram showing how the individual circuits of FIGS. 8 through 14 may be interconnected to form a self-synchronizing transmission loop.

The illustration used in FIG. 2 is an 8-item binary word where each item is either a binary 0 or a binary 1. The particular word used as the example of a transmitted word in the top curve is 100—1 where the first item is the single binary digit number of 1, the second item is 0, the third item is 0, and the eighth or last item is 1, the fourth through the seventh items not being shown in detail. The particular word used as an example of a received word in the bottom curve of FIG. 2 is 010—0 where the initial three items are 0, 1 and 0 and the eighth or last item is also 0. In subsequent description of the operation of the entire transmission loop, as shown in FIGS. 1 and 4, the receive current curve (lower curve) of FIG. 2 represents a series of return signals from a transponder to which has been transmitted a corresponding series of signals represented by the transmit curve (upper curve) of FIG. 2.

Each item in the upper curve of FIG. 2 is transmitted during a transmission time slot consisting of the sum of three successive time segments T1, T2 and T3. The three time segments T1, T2 and T3 are of approximately equal time duration. During the first time segment T1, a particular change in direct current signal level is used to represent the binary value of the item; that is, a change from zero level to the single positive level of plus one (+1) represents the single binary digit number of 1 and the equal but opposite change from zero level to the single negative level of minus one (−1) represents the single binary digit number of 0. During the second time segment T2, a change occurs in direct current signal level from plus one (+1) to minus one (−1). As will be appreciated, the change to the equal-but-opposite-polarity signal level during segment T2 not only represents a transition between time segment T1 and time segment T3 but also tends to reduce center-line-drift on or in a transmission medium. The signal during time segment T2 may be referred to herein as the correlate signal to that of time segment T1 of the same transmission time slot. During the third and last time segment T3, a change to a special signal level is used to represent the end of the transmission time slot for the item. The change from either plus one (+1) or minus one (−1) to the zero signal level is used during time segment T3 for each of the initial items (that is, items 1 through 7) of the group of items making up the word; and, during time segment T3 for the last item (that is, item 8), a change to the same signal level as that of time segment T1 for the last item is used not only to represent the end of the transmission time slot for the last item but also to distinguish the end of the transmission time slot for the last item from the end of the transmission time slot for an initial item. In the latter regard, it is to be noticed that an intentional violation of the basic signal format occurs during time segment T3 of the transmission time slot for the last item; and, in this regard, over a fair number of items of transmissions such a violation does not contribute excessively to a center-line-drift tendency.

In FIG. 2, the time interval LD, as will be understood from subsequent description, is the amount of loop delay (LD) from the time that a transmit signal transition occurs until a corresponding receive signal transition occurs. The delay LD is the sum of three separate time durations: the propagation time of the transmission path carrying a transmit signal from the transceiver to a return signal supplier; the supply time of the signal supplier; and, the propagation time of the transmission path carrying a return signal from the signal supplier back to the transceiver as a receive signal. For a given situation, the delay LD is essentially constant and the signal response time (T1 minus LD) of the transceiver is essentially constant; thus, all time segments are essentially equal since the transceiver transmits the signal for a particular time segment only after responding to the received corresponding return signal for the signal transmitted for the immediately preceding time segment.

In the bottom curve of FIG. 2, the transceiver receive current is an 8-item word which, as will be understood from subsequent description, may be either the same as the transmitted word or a different word. In any case, each of the items of the received signal is a return signal corresponding to a transmitted signal. In this respect, the signal format for the received return signals is the same as that for the transmitted signals except, as indicated in FIG. 2, there is no violation of the signal format during the last time segment of the transmission time slot for the last received return signal item.

In the top curve of FIG. 2, the transmission signal format allows a self-synchronizing system to exist in that each transmitted signal has a corresponding return signal which allows the next transmitted signal to occur. Also, the transmit signal format includes value information in time segment T1, center-line-drift reduction information in time segment T2, end-of-item information in time segment T3, and end-of-group information also in time segment T3 of the last item transmission time slot. This signal format requires no synchronizing signals other than the basic format. In addition, the format enables the use of a wide range of transmission rates since the time duration of each of the time segments is controlled only by the transmission path propagation time (or times), by the signal supplier return signal supply time, and by the signal response time of the transceiver.

The signal format of FIG. 3 is a direct current format essentially similar to that of FIG. 2 except that each change to a polarity of signal may be a change to either one of two levels: a one-unit level of either plus one (+1) or minus one (−1) and a two-unit level of either plus two (+2) or minus two (−2). Such an arrangement enables each item of information to consist of one of the four double binary digit numbers of 00, 01, 10 and 11. In this format, the signal during time segment T1 represents the value of the item by using the polarity (+ or −) of the signal level change to represent the left-hand binary digit and by using the signal level (1 or 2) to which the change occurred to signify the right-hand binary digit. For example, item 1 is the binary item 10 where the change from zero level to the positive signal level (+) in time segment T1 represents the left-hand digit of 1 and where the change to the signal level of one (1) represents the right-hand digit of 0. Similarly, a change from zero level to the negative signal level (−) in time segment T1 represents a left-hand digit of 0 and a change to the signal level of two (2) represents a right-hand digit on 1. In FIG. 3, as in the case of FIG. 2, the bottom curve represents, in the same signal format as the top curve, the return signals received by the transceiver.

Aside from the use of changes to double signaling levels, the signal format of FIG. 3 follows the same basic pattern as the signal format of FIG. 2 except that during the time segment T3 of the transmission time slot for the last item of one-one (11) the signal change will be of the same polarity direction as but not necessarily to the same signal level as the signal during time segment T1 for the same last item. The latter situation has been suggested in FIG. 3 by the use of dotted lines and a showing of both plus 1 (+1) and plus two (+2) in time segment T3 for the last item in the top curve. The latter situation will be understood from subsequent description.

In either of FIGS. 2 and 3, as will be understood from subsequent description, the transceiver will start transmission of the first item of a group by causing a proper change to occur to the proper signal level during time segment T1; the transceiver will change the signal level to the proper signal level for time segment T2 in response to a received return signal corresponding to the signal transmitted during time segment T1; the transceiver will change the signal level to the proper signal level for time segment T3 in response to a received return signal corresponding to the signal transmitted during time segment T2; and, the transceiver will stop transmission of the group of items upon receiving the return signal corresponding to the signal transmitted during time segment T3 for the last item.

A typical situation, as described hereinafter, whereunder a transceiver and a transponder are coupled by two data links so that signals may be transmitted from the transceiver to the transponder over one data link and so that return signals may be transmitted from the transponder to the transceiver over another data link, could involve the following timing considerations. Each of the time segment sT1, T2 and T3 of either of FIGS. 2 and 3 could be of the order of magnitude of 500 nanoseconds (ns). Of the 500 ns, perhaps 50 ns could represent the response time of each of the transceiver and the transponder and perhaps 200 ns could represent the propagation delay time of each of the data links. In such a situation, the time segments are of sufficiently short duration that for all practical purposes the signal levels will not change their magnitudes during those time segments even where transformer coupling is used, as in the exemplary embodiment, between the data links and other circuits.

SYMBOLS AND CIRCUIT CONVENTIONS

Figure 5:
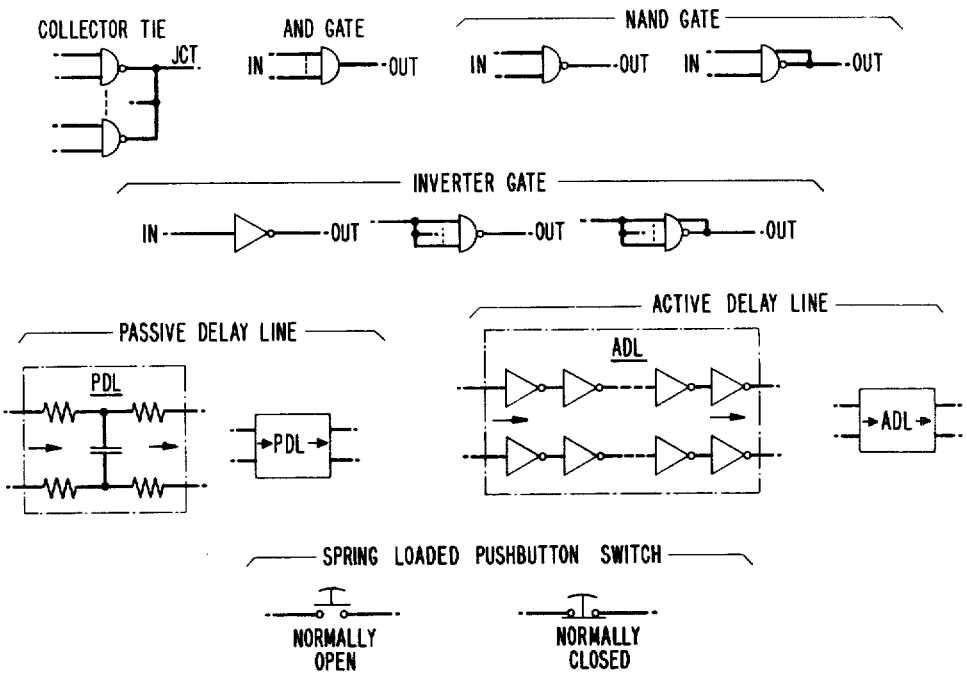
FIGS. 5 through 7 are useful in understanding some of the circuit symbols used in FIGS. 8 through 14.
Figure 6:
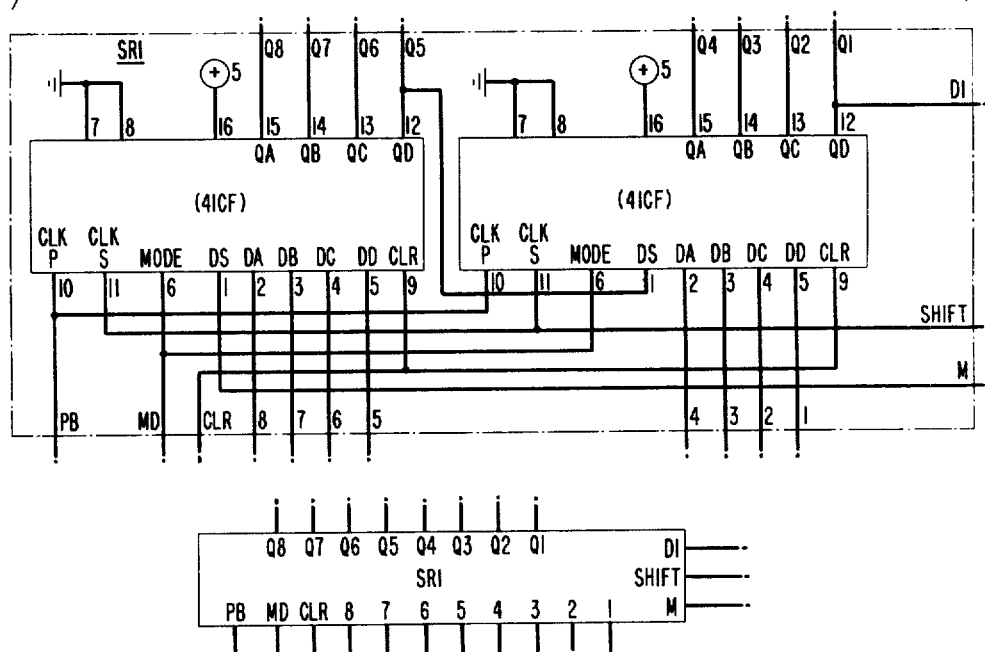
Figure 7:
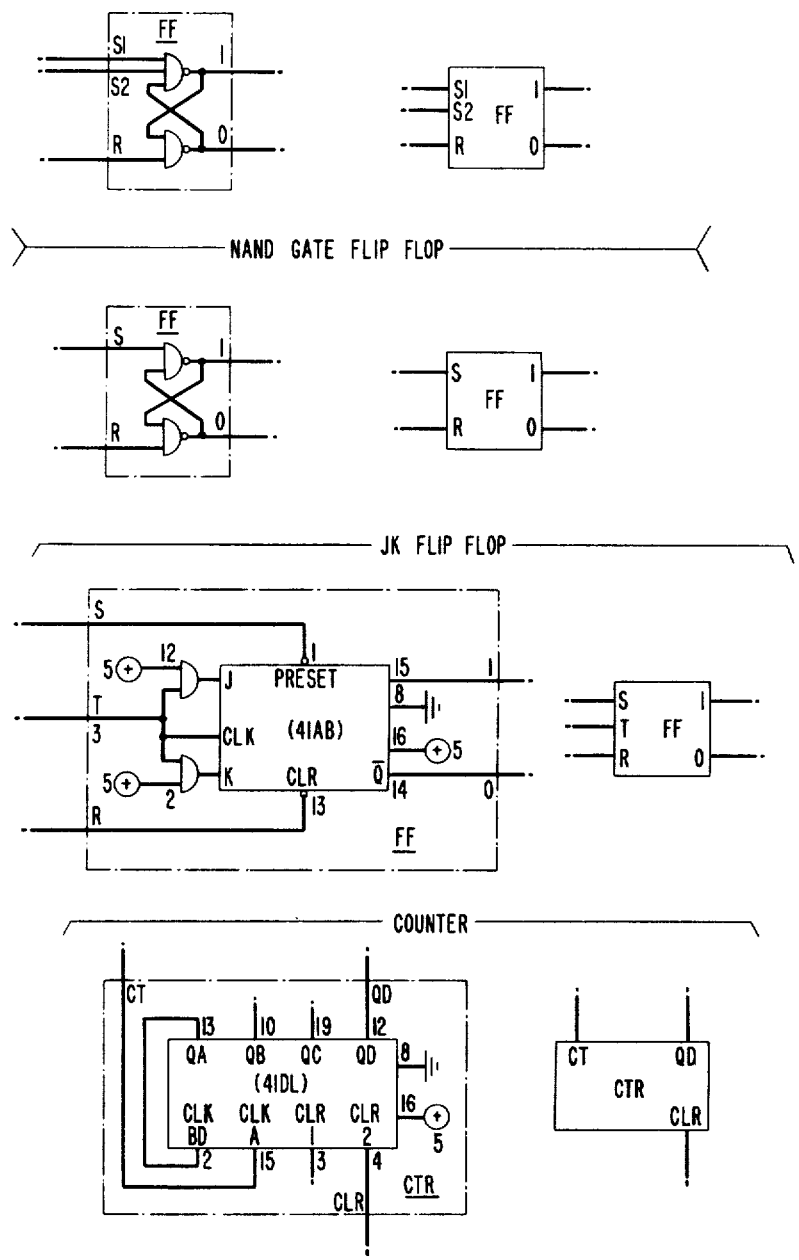

FIGS. 5 through 7 show some circuit symbols used for purposes of brevity in the circuits of FIGS. 8 through 14. These and other circuit conventions are explained below.

A circle enclosing a plus (+) sign and having the numerical 5 adjacent thereto is used to signify the positive terminal of a source of 5 volt direct current potential, the negative terminal of which is assumed to be grounded.

When either of the expressions "high" and "low" or their respective symbols "H" and "L" are used in subsequent descriptions, those expressions of symbols are intended to mean levels of direct current signals. High or H means a positive direct current voltage of approximately plus 5 volts; and, low or L means a direct current voltage of approximately ground potential. Similarly, a high-to-low (H to L) transition means a change of direct current potential from about plus 5 volts to about ground potential; and, a low-to-high (L to H) transition means a change from about ground potential to about plus 5 volts.

A light emitting diode is shown by a symbol such as that having the reference designation LEOT in FIG. 8 and will be understood to emit light when its lower terminal is L and to be extinguished (that is, not emitting light) when its lower terminal is H.

An "X" across a circuit path, such as the one designated 8 in FIG. 8, represents a single-pole single-throw throw switch which is normally unoperated so as to open the circuit path and which may be operated so as to close the circuit path. A dash "—" across a circuit path, such as the one designated M in FIG. 8, represents a single-pole single-throw switch which is normally unoperated so as to close the circuit path and which may be operated so as to open the circuit path.

In the upper part of FIG. 5 are shown various well-known circuit symbols for performing logic functions.

An AND gate provides a L output if any input is L and a H output only when all inputs are H. A NAND gate provides a H output if any input is L and a L output only when all inputs are H. A COLLECTOR TIE provides a H at its output junction JCT only when the outputs of al of the NAND gates are H; that is, any NAND gate output of L will cause the junction JCT to be L. An INVERTER gate provides an output (H or L) which is the inverse of the input (L or H).

In the lower part of FIG. 5 are shown a passive delay line PDL, an active delay line ADL, and two spring-loaded pushbutton switches. The PDL is a well-known network of passive circuit elements, such as resistance and capacitance, for causing a prescribed amount of time delay between the occurrence of a signal transition at its input (left) and the appearance of that signal transition at its ouput (right). The ADL is typically a network of active circuit elements, such as inverter gates, responsive to a signal transition occurring at its input (left) to cause a representation (that is either the same or a different signal transition) of that input signal transition to occur at its output (right) after a prescribed amount of time delay determined by the response time of the network. A spring-loaded pushbutton switch represents a well-known device which in its unoperated condition maintains a circuit path either normally open or normally closed under the control of a biasing means such as a mechanical spring. As is well known, such a switch may be manually operated against the action of the spring to cause the circuit path either to be closed (for a normally open switch) or to be opened (for a normally closed switch); and, when the switch is manually released, the switch returns to its normal condition. Thus, a momentary operation of such a switch will be understood to cause either a momentary closure or a momentary opening of the circuit path.

FIG. 6 shows how a pair of Western Electric Company (WE) 41CF integrated circuit devices may be interconnected so as to create an 8-bit shift register SR1. The SR1, whose symbol is shown at the bottom of FIG. 6, functions as follows: the CLR lead is normally H; when lead CLR is made H to L each of the outputs Q1 through Q8 is reset to L and remains L as long as lead CLR remains L; input leads 1 through 8 are made H or L according to a desired 8-bit binary word input where a binary 0 is represented by L and a binary 1 is represented by H and whose lead 1 represents the least significant bit of the desired input word; lead MD is either H to adjust the SR1 into its parallel feed mode or L to adjust the SR1 into its shift mode; leads PB and SHIFT are normally H; with leads CLR and MD at H, a H to L on lead PB causes the H or L input information on leads 1 through 8 to be fed through in parallel to set respective output leads Q1 through Q8 at H or L accordingly and regardless of the H or L condition on the SHIFT lead; with lead CLR at H and lead MD at L, a H to L on lead SHIFT causes the condition of Q8 to shift to Q7, the condition of Q7 to shift to Q6, and so forth, with the condition of Q2 shifting to Q1 and with whatever condition (H or L) exists on input lead M being shifted onto output lead Q8, all regardless of whether lead PB is H or L; the condition of output lead D1 will of course be the same as output Q; and, if any of the input leads PB, MD, CLR, and 1 through 8 happens to be in an open input condition, such a lead will be at H. Such shift registers as SR1 are used in the circuitry of FIGS. 8, 9 and 13.

In the uppermost part of FIG. 7 is shown how a flip-flop FF may be constructed using NAND gates so as to have a reset input R, two set inputs S1 and S2, an output 1 and an output 0. With S1 and S2 at H and R at L, the FF is reset with output 1 at L and output 0 at H. With either or both of S1 and S2 at L and R at H, the FF is set with output 1 at H and output 0 at low. With each of S1, S2 and R at H, the FF remains in its last set or reset condition. This type of FF is used in FIG. 12.

In FIG. 7, the NAND gate FF having a single set input S functions in the same way as the above-described FF at the upper part of FIG. 7 except, of course, that only one set input S is involved. This type of FF is used in FIGS. 9, 11, 12 and 14.

The JK flip-flop FF of FIG. 7 may be constructed as shown using a WE 41AB integrated circuit device and functions as follows: the toggle input T is normally H; with the set input S at H and the reset input R made to go H to L, the FF is reset with output 1 at L and output 0 at H; with R at H and S made to go H to L, the FF is set with output 1 at H and output 0 at L; and, with inputs S and R at H, a H to L on toggle input T causes the H or L condition on outputs 1 and 0 to reverse themselves. The JK type of FF is used in FIGS. 11 and 12.

At the bottom of FIG. 7 is shown how a binary counter CTR may be constructed using a WE 41DL integrated circuit device. The CTR functions as follows: input lead CLR is normally L and a L to H on lead CLR resets outut QD to L; input lead CT is normally H; and with lead CLR at L, each successive H to L on lead CT is a count and when the CTR has reached the count of eight from a reset condition, output QD will show a L to H signal transition. Such a counter CTR is used in FIG. 8.

INTERCONNECTION DIAGRAM

FIG. 4 shows how the circuits of FIGS. 8 through 14 are interconnected to provide a self-synchronizing system. The input circuit is according to FIG. 8; the output circuit is according to FIG. 9; the data loop is according to FIG. 10; the transceiver TRSCE is according to FIG. 11, the transponder TRSPD is according to FIG. 12; the modulator MOD is according to FIG. 13; and, the demodulator DEMOD is according to FIG. 14.

BLOCK DIAGRAM

FIG. 1 may be used to understand in an overall functional way how the self-synchronizing system operates with either a single-level bipolar return-to-zero signal format as in FIG. 2 or a double-level bipolar return-to-zero signal format as in FIG. 3. The symbolic switches MD1 through MD4 are in the open condition (as shown) if the signal format of FIG. 2 is used since the modulator and demodulator are not required in that situation as will be explained; and, switches MD1 through MD4 will be closed if the signal format FIG. 3 is used since the modulator and demodulator are required in that situation as also will be explained. If the transponder is used for two-way transmission, then symbolic switches A1, A2, P1 and P2 will be open (as shown) and symbolic switch CD will be closed (as shown). If the active delay line is used for one-way transmission, then switches A1 and A2 will be closed, switches P1 and P2 will be open, and switch CD will be opened. If the passive delay line is used for one-way transmission, then switches P1 and P2 will be closed, switches A1 and A2 will be open, and switch CD will be opened.

Assuming that the signal format of FIG. 2 is used for two-way transmission, the input circuit will have been adjusted to specify an 8-item binary word for transmission by the transceiver. Each item of the latter word is one of the single binary digit numbers of 1 and 0, such as the word 100—1 used as an example in FIG. 2. With reference to FIG. 1, the transceiver starts transmission of the word by causing the first signal to occur at the transmit terminal (right) of the transceiver and at the input terminal (left) of the data loop according to the first binary value of 1 specified by the input circuit. This first signal is a change from zero level to the signal level of +1 during time segment T1 for the first item. Data link A of the data loop exhibits a particular signal propagation delay time at the end of which the first signal change to +1 occurs at the input (left) of the remote transponder. The output circuit will have been adjusted to specify an 8-item binary word for transmission of return signals by the transponder back to the transceiver. Each item of the latter word is also one of single binary digit number of 1 and 0, such as the word 010----0 used by example in the bottom curve of FIG. 2. The transponder will recognize at its input (left) the occurrence of the incoming signal change to the level of +1 and will generate at its output to switch CD a return signal according to the first item specified by the output circuit. The latter first item, in the assumed example, is a change from zero level to the signal level of −1 according to the value 0 of the first binary digit specified by the output circuit. This return signal change to −1 occurs at the input (right) of the data link B of the data loop, is delayed by the signal propagation delay time of data link B, and then occurs at the output (left) of data link B and at the receive terminal (bottom right) of the transceiver. The latter return signal change to −1 is received at the transceiver, as indicated in FIG. 2, after a total loop delay time LD measured from the start of time segment T1 in FIG. 2 for the first item of a change to +1 transmitted by the transceiver. This loop delay LD, as is apparent, consists of the sum of three time intervels: the signal propagation time of data link A, the signal response time of the transponder, and the signal propagation time of data link B.

Upon receipt of the return signal change to −1, the transceiver will perform some control functions so as to end time segment T1 and so as to prepare to cause the signal change from the level of +1 to the level of −1 to occur at its transmit terminal (right) according to the required signal to be transmitted during time segment T2. The amount of time required for the transceiver to perform these control functions is indicated in FIG. 2 as that part of time segment T1 remaining at the end of the delay time LD. One such control function, which occurs near the end of time segment T1, is to provide to the input circuit a "COUNT" signal to inform the input circuit that the first signal for the first item has been transmitted. In this way the input circuit keeps a count of the number of items transmitted so as to provide to the transceiver, as will be explained later, an end-of-group (that is, an end-of-word) signal during transmission by the transceiver of the last item of the word so that, also as will be explained later, the signal during the time segment T3 for the last transmitted item can be adjusted to distinguish the end of the transmission of the last item of the word from the end of transmission of an initial item of the word.

When the transceiver has completed the control functions prior to the end of time segment T1, the transceiver causes the signal change to the level of −1 to occur at its transmit terminal (right) to define the start of time segment T2. The signal level change to −1 during time segment T2 is the correlate signal for the binary value of 1 represented by the signal level change to +1 during time segment T1. This correlate signal is provided to reduce the tendency of center-line-drift to occur in or on the data loop.

In the meantime, the first signal level change to −1 is still being received by the transceiver from the data loop as the value signal for the first item of 0 returned from the transponder. The signal level change to −1 from the transceiver during time segment T2 is again delayed by data link A to the input (left) of the transponder. The transponder will recognize the signal transition at the beginning of the transmission time segment T2 from the data link A and will perform control functions to cause the signal level change to +1 to be returned to the data link B as the correlate signal for the value signal level change to −1 which was returned to the transceiver during time segment T1 of the transponder signaling. One such control function of the transponder is to send to the output circuit a "SHIFT" signal so that the output circuit can specify to the transponder the value of the next item to be transmitted to the data link B when the proper time occurs. This SHIFT signal also stores in the output circuit the value of the first item transmitted to the transponder from data link A.

Eventually, at the end of the loop delay time LD from the start of time segment T2 of the transceiver transmission, the return signal level change to +1 will arrive at the input (lower right) to the transceiver. Upon the receipt of this return signal, the transceiver performs control functions to prepare to cause the third signal during time segment T3 to occur at the transmit terminal (right) of the transceiver. One such control function is to send to the input circuit, at about the end of time segment T2, a "SHIFT" signal to cause the input circuit to specify to the transceiver the value of the second item to be transmitted to data link A when the proper time occurs. The SHIFT signal also stores in the input circuit the value of the first item returned to the transceiver from data link B.

After the control and response time of the transceiver, the latter will cause to occur at its transmit terminal (right) the signal level change to the zero level during time segment T3. This signal level change to zero level represents the end of the transmission time slot (that is, the sum of time segments T1, T2 and T3) for the first item of 1. Again, at this time (that is, the early part of time segment T3) the transceiver is still receiving the return signal level change to +1 from data link B.

After the delay through data link A, the change to zero signal level occurs at the input (left) of the transponder which thereupon performs control functions preparatory to causing the signal level of +1 to change to the signal level of zero as a return signal to the transceiver corresponding to the signal level change to zero received from the transceiver. When the zero level return signal change from the data link B is received by the transceiver, after the loop delay LD measured from the beginning of the transceiver transmitted time segment T3, the transceiver will perform control functions to prepare to start transmission of a signal level change during time segment T1 for the next item in the word.

The above sequence of events is repeated for each item transmitted by the transceiver and for each item returned from the transponder to the transceiver. However, the last time segment T3 of the transceiver's last transmitted item will not be a change to the zero signal level as in the case of all the initial items. Near the end of time segment T1 of the last transceiver transmitted item, the transceiver will have sent a COUNT signal to the input circuit which, in turn, will thus have counted up to eight transmitted items. In response to having counted to eight, the input circuit will at once supply to the transceiver an end-of-group (that is, an end-of-word) signal which, in turn, will be used by the transceiver to adjust the signal level change during time segment T3 for the last item to be of the same polarity as the signal level change to +1 (according to the assumed last item of binary 1) during the time segment T1 for the last item. The last time segment T3 for the last transmitted item is thus seen to deviate from and thus to violate the signal format for the last time segment T3 for each of the initial items. It is this violation of the initial item signal format which allows the transponder to ascertain whether the item it received is an initial item or the last time of the transmitted word, as will be explained later.

When the transceiver receives the return signal level change to zero from the transponder corresponding to the last time segment T3 transmission from the transceiver, the latter ends transmission of the word or group of binary numbers. The entire process may be repeated by resetting the input and output circuits and by allowing the transceiver to again start transmission.

In the foregoing discussion regarding the signal format of FIG. 2, it will be appreciated that the signal levels used for the various time segments T1, T2 and T3 are direct current signal levels of +1, −1 and zero. However, as will be apparent, the actual signal changes or transients are the controlling signals since transformer coupling is used to and from the data links A and B. For example, at the start of time segment T1 for item 1 of the upper curve in FIG. 2, the transmitted signal level changes from zero to +1, at the start of time segment T2 (that is, the end of time segment T1) the transmitted signal level changes from +1 to −1, at the start of time segment T3 (that is, the end of time segment T2) the transmitted signal level changes from −1 to zero, and so forth. Those signal level changes or transients are the controlling signals; but, as explained previously, the time duration of the time segments, such as about 500 ns, are short enough such that each of the signal changes or transients at the boundaries of the time segments does not decay to any appreciable extent before the next change or transient occurs. Thus, the direct current signal levels of FIG. 2 are close approximations to actual conditions.

If in FIG. 1 an active delay line is used for one-way transmission to the remote transponder, then the signal level changes transmitted by the transceiver transmit terminal (right) will pass not only through the data link A to the transponder but also through closed switch A1, through the active delay line, and through closed switch A2 back to the receive terminal (lower right) of the transceiver. The amount of delay time of the active delay line may be adjusted to any desired time such that the leading edge (start of a time segment) of a transmitted signal level change is received at the transceiver as a corresponding return signal a time LD later. Also, the polarity of the return signal level change may be either the same as or the opposite of the polarity of the corresponding transmitted signal level change.

Similarly, in FIG. 1, if a passive delay line is used for one-way transmission to the remote transponder, the signal level changes transmitted by the transceiver will pass not only through the data link A to the transponder but also through at least part of the data link A through closed switch P1, through the passive delay line, through closed switch P2, and through at least part of the data link B back to the transceiver. In this case, as in the case of an active delay line, the return signal level change corresponding to a transmitted signal level change can be delayed by a time LD and can be adjusted to any desired polarity.

It will be appreciated that for one-way transmission the transponder will receive from the transceiver exactly the same information as it would have received if the transponder were also transmitting its own information back to the transceiver as the return signal levels.

If the signal format of FIG. 3 is used, then it is necessary to include the modulator and demodulator circuits by closing the symbolic switches MD1 through MD4. The same situations occur as above described regarding the signal format of FIG. 2 except that the transceiver modulator, and the transponder modulator when two-way transmission is used, must be adjusted to prescribe the level (that is 1 or 2 of either polarity) to which the signal changes for time segment T1 since, as previously explained, the polarity of the signal level change during time segment T1 represents the left-hand binary digit of the item and the 1 or 2 level of the signal change of either polarity during time segment T1 represents the right-hand binary digit of the item. Also, as will be seen from the dotted lines in FIG. 3, and as will be explained later, the level to which the transceiver transmit signal changes during time segment T3 for the last transmitted item may be either level 1 or level 2 since it is only the polarity of that signal that is of significance. In the latter regard, the polarity of the signal during the last time segment T3 will be the same as the polarity of the signal during the last time segment T1. As will be apparent, the demodulators are used to detect different ones of the 1 and 2 signal levels during signaling according to the format of FIG. 3.

The next sections of the detailed description explain the manner in which the detailed circuits of FIGS. 8 through 14 function so as to bring about the overall functions above described with regard to FIG. 1. In this regard, as has been mentioned, FIG. 4 shows exactly how FIGS. 8 through 14 are interconnected.

INPUT CIRCUIT

In FIG. 8, the condition of the input and output leads to and from the input circuit will be as follows prior to the start of transmission by the transceiver of FIG. 11. Output lead STOP, and lead EOTV by way of switch S1 being in position 1, into FIG. 11 will be H at the output of gate G3 since the output of gate G1 is L due to a H on output QD of counter CTR resulting from counter CTR having detected eight counts on lead COUNT incident to a prior transmission. The purpose of switch S1 will be explained later. Output lead CLR into FIG. 11 will be L due to the closed condition of pushbutton CL. The effect of opening switch CL will be explained later. Output lead D1 will be H or L according to the H or L condition of output Q1 of SR1.

Figure 11:
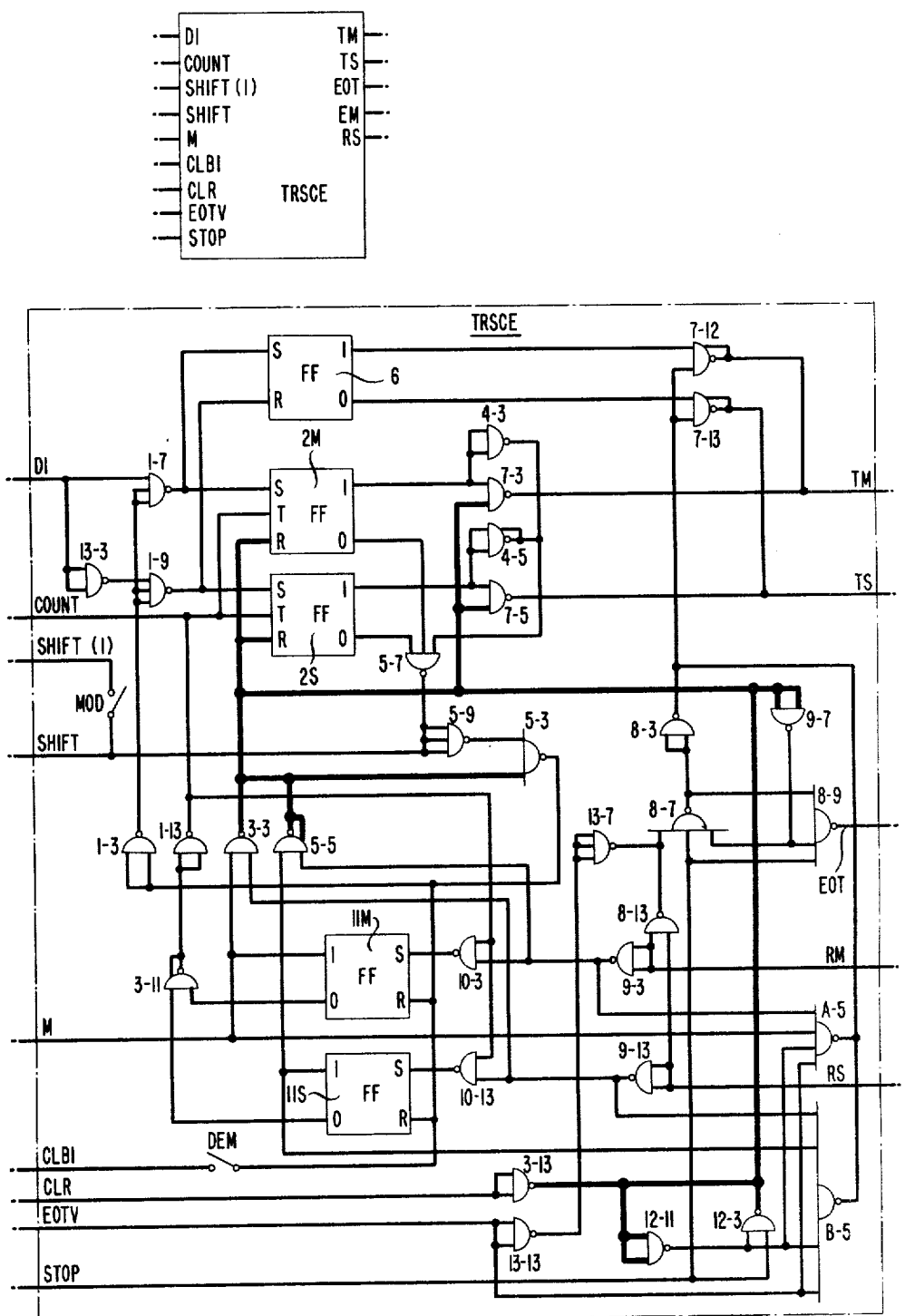
FIG. 11 shows the details of the Transceiver circuit of FIGS. 1 and 4.

Input lead M from FIG. 11 into into FIG. 8 will be H or L according to whether the FF 11M of FIG. 11 is set or reset. The input lead COUNT from FIG. 11 will be L from the output in FIG. 11 of gate 1-13. Input lead SHIFT from FIG. 11 will be L from the output in FIG. 11 of gate 5-7. Input lead EOT from FIG. 11 will be L from the output in FIG. 11 of gate 8-9; thus, the LED (light emitting diode) LEOT in FIG. 8 will be extinguished to signify that the transceiver of FIG. 11 has finished its previous transmission.

Setting the input circuit according to the desired information to be transmitted by the transceiver of FIG. 11 begins with a momentary operation of pushbutton CLR to cause input CLR of SR1 to experience a momentary H to L to H. The H to L transition upon operation of pushbotton CLR resets to L each of the outputs Q1 to Q8 of SR1. The release of pushbutton CLR returns to H the input CLR of SR1. Next, it will be assumed that the signal format of FIG. 2 is to be used to transmit the eight single binary digits of 10011011 corresponding to respective switches 1 through 8 of SR1. Accordingly, switches 1 through 8 will be placed in the respective conditions of open, closed, closed, open, open, closed, open, and open. Thus, respective terminals 1 through 8 of SR1 will be conditioned so that terminal 1 is H(=1), terminal 2 is L(=0), terminal 3 is L(=0), terminal 4 is H(=1), terminal 5 is H(=1), terminal 6 is L(=0), terminal 7 is H(=1) and terminal 8 is H(=1). Switch M is next operated so that input MD of SR1 is H to arrange SR1 for parallel feed of the condition of its inputs 1 through 8 to its outputs Q1 through Q8. Then, with inputs MD and CLR of SR1 both H, pushbotton PB is momentarily operated to cause input PB of SR1 to have a monetary L to H to L. The H to L transition at input PB of SR1 due to the release of pushbutton PB causes the respective outputs Q1 through Q8 of SR1 to be either set (H) or reset (L) according to the respective conditions of inputs 1 through 8 of SR1. Thus, as assumed, outputs Q1 through Q8 will be conditioned so that Q1 is H(=1), Q2 is L(=0), Q3 is L(=0), Q4 is H(=1), Q5 is H(=1), Q6 is L(=0), Q7 is H(=1) and Q8 is H(=1). As will be apparent at this time, LEDs L2, L3 and L6 will be extinguished and LEDs L1, L4, L5, L7 and L8 will be lighted to verify that the desired input has indeed been effected (that is, a lighted LED signifies a 1 and an extinguished LED signifies a 0). Next, the switch MD is released to render L the input MD of SR1 to change SR1 from its parallel feed mode to its shift mode so that SR1 can be controlled by signals incoming thereto on lead SHIFT from the transceiver of FIG. 11. At this time, the H of output Q1 is present as a H on lead D1 toward FIG. 11 to specify to the transceiver that the first digit to be transmitted is a 1.

The system is caused to start transmission by a momentary operation either of pushbutton START if switch S2 (a continuity-transfer switch) is in position 1 as shown or of pushbutton PG if switch S2 is in position 2. With switch S2 in position 2, the momentary operation of pushbutton PG causes a L to H to L transition at input CLR of the counter CTR. With switch S2 is position 1, the momentary operation of pushbutton START causes a PULSE GENERATOR to produce a L to H to L pulse at input CLR of counter CTR. In either case, the L to H transition at input CLR of counter CTR resets its output QD to L, which renders H the output of gate G1. However, the L to H at input CLR of counter CTR renders L the output of gate G2 to maintain H the output of gate G3 on leads STOP and EOTV. When the input CLR of counter CTR returns H to L, the output of gate G2 will go H to allow the output of gate G3 to go L on leads STOP and EOTV toward the transceiver of FIG. 11. This H to L transition on leads STOP and EOTV toward the transceiver of FIG. 11 will, as will be explained later, enable the transceiver to start transmission of the eight single binary digits previously set up for transmission in SR1 of FIG. 8.

When the transceiver of FIG. 11 begins transmission, lead EOT into FIG. 8 from FIG. 11 will go from L to H and will remain H until the transceiver ends transmission of the eight binary digits. The LED LEOT in FIG. 8 will thus become lighted and will remain lighted until the end of the transmission by the transceiver of the eight digits. The lighted LEOT of FIG. 8 is a visual signal that such transmission is taking place.

As will be explained in detail later, the transceiver of FIG. 11 will perform the following two functions shortly prior to starting transmission of the first digit signified as a 1 by virtue of the H on lead D1 from FIG. 8 into FIG. 11: the COUNT and SHIFT leads from FIG. 11 into FIG. 8 will both be made H but the L to H transitions on leads COUNT and SHIFT will have no effect on FIG. 8. Shortly before the end of time segment T1 for transmission of the first digit of 1, the transceiver will cause lead COUNT to go H to L into FIG. 8 as an indication that the first digit is being transmitted. This H to L at input CT of counter CTR in FIG. 8 causes counter CTR to effect a count of one. At about the end of time segment T2 for transmission of the first digit, the transceiver of FIG. 11 will cause a H to L to occur on lead SHIFT into FIG. 8. The H to L on lead SHIFT causes two events to occur regarding SR1 of FIG. 8: the conditions (H or L) of respective outputs Q8, Q7, Q6, Q5, Q4, Q3, and Q2 shift down to respective outputs Q7, Q6, Q5, Q4, Q3, Q2, and Q1; and the H or L on lead M from the transceiver into FIG. 8 is caused to appear on output Q8 of SR1. As a result of this shifting operation, output Q1 of SR1 is now L according to the second binary digit of 0 and lead D1 is also L into FIG. 11 to signify this fact to the transceiver. At the same time the condition of the LEDs L1 through L8 will visually verify the new situation resulting from the shift.

Near the end of time segment T3 during transmission of the first digit, the transceiver will return to H both of the leads COUNT and SHIFT in preparation for the next count and shift signals during transmission of the second digit.

The above process continues until a H to L appears on lead COUNT as the eighth count from the transceiver of FIG. 11 to indicate that the transceiver is transmitting the last or eighth binary digit of 1. The latter digit of 1 is represented on lead D1 as a H since the output Q1 by this time will be H as a result of the original condition of output Q8 having ultimately been shifted to output Q1. This eighth H to L transition on lead COUNT will result in counter CTR of FIG. 8 reaching a count of eight to cause its output QD to go H to cause the output of gate G1 to go L to in turn cause the output of gate G3 to go H on leads STOP and EOTV into the transceiver of FIG. 11.

The L to H on leads STOP and EOTV into the transceiver of FIG. 11 will cause the transceiver to stop transmission at the end of the last or eighth digit. During that last transmission by the transceiver, the SHIFT lead into FIG. 8 is made to go H to L at about the end of time segment T2 to cause one last shift in SR1 of FIG. 8. SR1 of FIG. 8 will then have its outputs Q1 through Q8 conditioned according to the eight successive indications (H or L) present on lead M from FIG. 11 into FIG. 8 during the eight successive H to L transitions on lead SHIFT into FIG. 8.

At the end of transmission, the transceiver will cause lead EOT into FIG. 8 to return to L so that LED LEOT of FIG. 8 is extinguished to signify the end of transmission of the eight binary digits.

As a result of the above transmission by the transceiver of the eight binary digits originally set up on switches 1 through 8 of FIG. 8, the input circuit is returned to its initial condition as follows: leads STOP and EOTV are H from FIG. 8 into FIG. 11 so that these leads may be caused to go H to L to cause the transceiver to start transmission of another group of binary digits; lead CLR remains L from FIG. 8 into FIG. 11; lead EOT is L from FIG. 11 to cause LED LEOT to be extinguished; leads COUNT and SHIFT from FIG. 11 in FIG. 8 are L; and, leads D1 into FIG. 11 and M from FIG. 11 will be H or L depending upon the particular situation.

The pushbutton CL in FIG. 8 may be used at any time, as will be explained later, to effect a manual resetting of the transceiver of FIG. 11.

The switch S1 in FIG. 8 is normally in position 1 as shown so that, as will be explained later, the transmitted signal during time segment T3 of the last transmitted digit (see FIG. 2) will be different from the same signal for the initial transmitted digits. If for any reason it is desired that the signal during time segment T3 be the same for all transmitted digits, switch S1 may be moved to its position 2. The details of such a situation will be discussed below in connection with the detailed description of the transceiver of FIG. 11.

OUTPUT CIRCUIT

Figure 12:
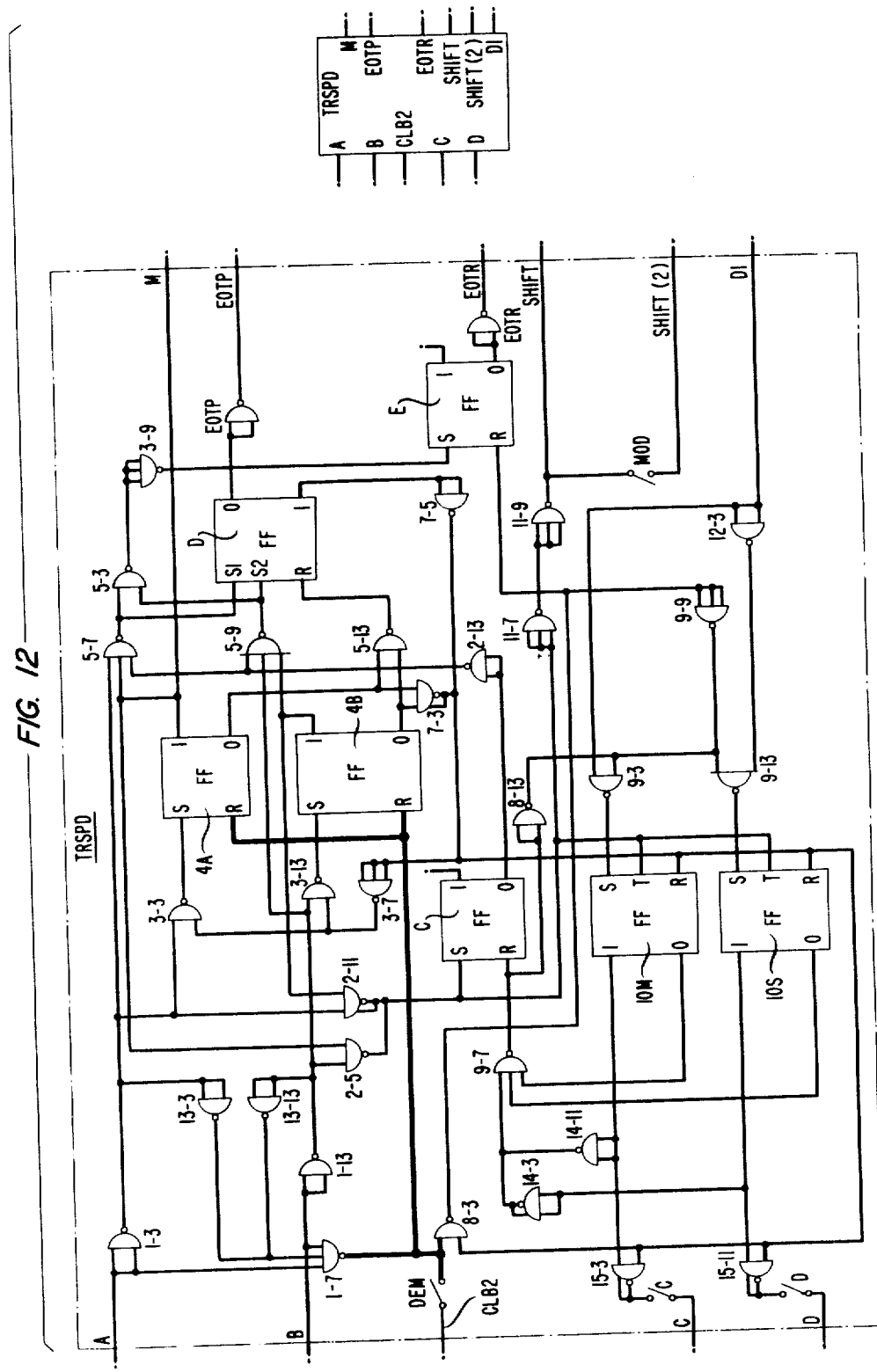
FIG. 12 shows the details of the Transponder circuit of FIGS. 1 and 4.

The output circuit of FIG. 9 is used, as referred to earlier, to prescribe for the transponder of FIG. 12 the eight binary digit values which are returned to the transceiver of FIG. 11 as return signals corresponding to the eight binary digit values transmitted to the transponder. The use of the output circuit of FIG. 9 assumes that the remote transponder is being used to provide the return signals in lieu of either the active or the passive delay line as described previously in connection with FIG. 1.

SR1 of FIG. 9 is arranged in the same manner as SR1 of FIG. 8 but may, as is obvious, be arranged to prescribe whatever group of eight binary digits as is desired. Outputs Q1 through Q8 of SR1 in FIG. 9 will be assumed to have been adjusted as follows according to the assumed group of single binary digits of 01011100 according to the signal format of FIG. 2: Q1 is L(=0), Q2 is H(=1), Q3 is L(=0), Q4 is H(=1), Q5 is H(=1), Q6 is H(=1), Q7 is L(=0) and Q8 is L(=0); and, LEDs L2 and L4 through L6 are lighted and LEDs L1, L3, L7 and L8 are extinguished so that the respective LEDs visually display the group of digits 01011100.

The initial conditions of the input and output leads in FIG. 9 are as follows. The input lead SHIFT into FIG. 9 from FIG. 12 is H from the output of gate 11-9 in FIG. 12. The input M lead into FIG. 9 from FIG. 12 is H or L according to the condition of output 1 of FF 4A in FIG. 12. Input lead EOTP is L from the output of gate EOTP in FIG. 12. Input lead EOTR is H from the output of gate EOTR in FIG. 12. Output lead D1 will be L to correspond to the L on output Q1 of SR1 in FIG. 9.

In FIG. 9, the output of gate G4 is H due to its L input on lead EOTP. As will be explained later in connection with the description of the transponder of FIG. 12, during transponder action just prior to the end of transmission of a prior group of binary digits, FF EOT of FIG. 9 will have been set (output 1 is H) so that LED LEOTP will be extinguished as an indication that the transponder is in the idle or standby condition.

During the functioning of the transponder of FIG. 12 in response to the start of transmission by the transceiver of FIG. 11, lead EOTR into FIG. 9 from FIG. 12 will provide a H to L at the reset terminal R of FF EOT in FIG. 9 to reset FF EOT so that its output 1 is made L to light LED LEOTP as a visual indication that the transponder is in a busy condition.

Shortly prior to the end of time segment T3 of the transponder's first return signal transmission to the transceiver by way of the data loop of FIG. 10, lead SHIFT into FIG. 9 from FIG. 12 is made H to L to result in the shifting down of the outputs Q8 to Q2 of SR1 to outputs Q7 to Q1, as in the case of the shifting operation previously described in connection with FIG. 8. Also, as in the case of FIG. 8, the changing condition (H or L) on lead D1 from FIG. 9 into FIG. 12 informs the transponder of the successive binary digit values to be transmitted to the transceiver by way of the data loop as return signals.

The lead M into FIG. 9 from FIG. 12, as will be explained, supplies to the shift register SR1 of FIG. 9 the successive binary digit values received by the transponder from the transceiver by way of the data loop.

The transponder continues to receive successive binary digits from the data loop and to store these digits in shift register SR1 of FIG. 9 by way of lead M. At the same time, the transponder continues to transmit to the transceiver by way of the data loop the binary digits originally set up in shift register SR1 of FIG. 9 and successively supplied to the transponder over lead D1 into FIG. 12 from FIG. 9.

In FIG. 9, leads EOTP and EOTR from the transponder of FIG. 12 will both be L throughout transmission of a group of digits between the transceiver and the transponder. As will be recalled in connection with the description of the signal format of FIG. 2, the transmission signal during the time segment T3 from the transceiver to the transponder by way of the data loop is a change to zero for each initial digit but is not a change to zero for the last digit. The transponder of FIG. 12 monitors for a received signal level change other than to zero during time segments T3 in order to detect the violation of the signal format during the last received digit. If such a special situation is ascertained by the transponder, as will be explained, the transponder will cause both of leads EOTP and EOTR into FIG. 9 to become H to set FF EOT of FIG. 9 so that its output 1 is made H to extinguish LED LEOTP as a visual indication that the transponder is in an idle or standby condition.

As has been discussed above in connection with the input circuit of FIG. 8, if switch S1 of FIG. 8 is placed in its position 2, the transceiver of FIG. 11 will send a change to zero level signal during time segment T3 of its last transmitted digit and there will be no signal format violation detected by the transponder. Consequently, there will be no end-of-transmission signal sent by the transponder to the output circuit of FIG. 9. The latter situation will allow LED LEOTP to remain lighted in FIG. 9 to visually indicate that the transponder is still busy. The later busy indication signifies that there may be additional transmission from the transceiver without the necessity of the transceiver having sent an end-of-group signal during time segment T3 of its last digit transmission. Such an arangement may be useful in certain circumstances although the preferred arrangement is where the signal sent by the transceiver during time segment T3 of its last digit transmission is capable of being ascertained by the transponder as the end-of-group signal.

After the transceiver and the transponder have exchanged groups of binary digits, the shift register SR1 of FIG. 9 will contain the group sent by the transceiver and the LEDs L1 through L8 will visually indicate that group of eight binary digits.

DATA LOOP

Figure 10:
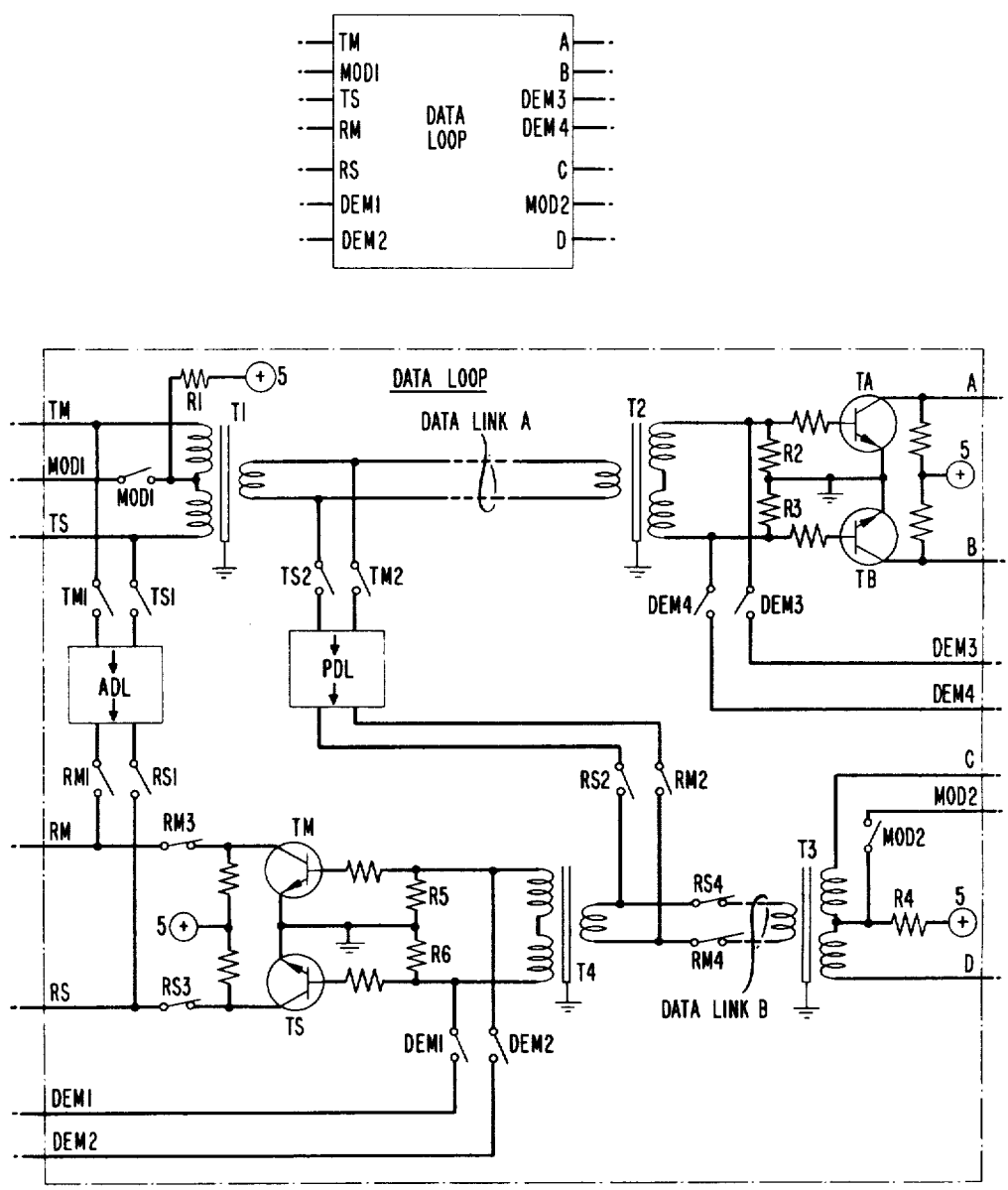
FIG. 10 shows the details of the Data Loop circuit of FIGS. 1 and 4.

The data loop of FIG. 10 provides the circuitry whereby the transceiver of FIG. 11 can transmit signals to the transponder of FIG. 12 and whereby corresponding return signals may be received by the transceiver either (1) from the transponder or (2) from the passive delay time PDL or (3) from the active delay line ADL, all as has been generally described previously in connection with FIG. 1.

Assuming that the signal format of FIG. 2 is being used along with similar return signal transmission from the transponder, in FIG. 10 switches TM1, TS1, RM1, RS1, TS2, TM2, RS2, RM2, DEM1 through DEM4, MOD1 and MOD2 will be open as shown and switches RS4, RM4, RM3 and RS3 will be closed as shown. The signals from the transceiver of FIG. 11 to the data loop of FIG. 10 will appear as inputs on leads TM and TS in FIG. 10. The signals from the data loop to the transponder of FIG. 12 will appear as outputs on leads A and B in FIG. 10. The return signals from the transponder to the data loop will appear as inputs on leads C and D in FIG. 10. The return signals from the data loop to the transceiver will appear as outputs on leads RM and RS in FIG. 10.

Before transmission is started leads TM and TS will both be H from the outputs of gates 7-3 and 7-5 (and gates 7-12 and 7-13) of the transceiver in FIG. 11. The result of this situation is zero current in the primary winding (left) of transformer T1 in FIG. 10, zero current in the secondary winding (right) of transformer T1, zero current in the data link A and in the primary winding (left) of transformer T2, and zero current in the secondary winding (right) of transformer T2. With zero current in the secondary winding of transformer T2, transistors TA and TB will both be in the OFF conditon to cause both of leads A and B to be H into the transponder of FIG. 12 as a zero current indication. Similarly, the leads C and D into FIG. 10 from the transponder of FIG. 12 will both be H to result in zero return current in the primary winding (right) of transformer T3, zero current in the secondary winding (left) of transformer T3 and in data link B and in the primary winding (right) of transformer T4, and zero current in the secondary winding (left) of transformer T4. With zero current flow in the seconedary winding of transformer T4, transistors TM and TS will both be in the OFF condition to cause both of leads RM and RS to be H into the transceiver of FIG. 11 as a zero current indication.

Whenever the transceiver of FIG. 11 is to transmit a binary 1 it will be assumed that lead TM in FIG. 10 is made L with lead TS remaining H. This will cause current to flow in the upper primary winding (left) of transformer T1 due to the change from H to L of lead TM. This current surge will be reflected into the dark link A and will cause a current surge of a certain amplitude and a certain polarity to occur in the secondary winding (right) of transformer T2. It will be assumed that the latter current surge in the secondary winding of transformer T2 is in such a direction as to cause transistor TA to turn ON so that lead a is made L into the transponder of FIG. 12, transistor TB remaining OFF so lead B remains H.

Whenever the transceiver of FIG. 11 is to transmit a binary 0 the reverse of the above situation will occur so that leads TM and TS into FIG. 10 are respectively H and L, a reverse current condition occurs through transformers T1 and T2 and through data link A, transistor TB is ON and transistor TA is OFF and leads A and B are respectively H and L into the transponder of FIG. 12.

With regard to return signal transmissions from the transponder of FIG. 12 toward the transceiver of FIG. 11 by way of the data loop of FIG. 10, the following situations are assumed. A binary 1 signal is represented by a H to L on lead C with a H on lead D into FIG. 10 such that current flows in the upper primary winding (right) of transformer T3, a suitably polarized surge of current occurs in data link B and in the primary winding (right) of transformer T4 and in the secondary winding (left) of transformer T4, and transistor TM is turned ON with transistor TS OFF so that leads RM and RS into the transceiver of FIG. 11 are respectively L and H.

Also, whenever the transponder of FIG. 12 is to transmit a binary 0 as a return signal, the reverse of the above situation will prevail with lead C at H and lead D going from H to L into FIG. 10 so that a current flows in the lower primary winding (right) of transformer T3, a reverse current surge occurs through transformer T3 and T4 and data link B, transistor TS is ON and transistor TM is OFF, and leads RM and RS are respectively H and L into the transceiver of FIG. 11.

If the passive delay line PDL in FIG. 10 is used to supply return signals to the transceiver, instead of having the transponder provide the return signals, switches TS2, TM2, RS2, and RM2 will be closed and switches TM1, TS1, RM1, RS1, RS4 and RM4 will be opened. It will be seen that the signals transmitted by the transceiver of FIG. 11 into the data loop of FIG. 10 on leads TM and TS will be provided at the other end of the data link A to the transponder of FIG. 12 on leads A and B in FIG. 10. Also the transmitted signals from the secondary winding (right) of transformer T1 will be supplied through the passive delay line PDL to the primary winding (right) of transformer T4. By this means, the passive delay line PDL delays all transmitted signals by a prescribed amount of time and then causes corresponding representative signal transitions to occur as the return signals at the transceiver receive terminals on leads RM and RS. It will be obvious that such return signals may involve signal transitions either of the same polarity or of the opposite polarity to those being transmitted over data link A toward the transponder.

Also, if the active delay line ADL in FIG. 10 is used to supply return signals to the transceiver of FIG. 11, switches TS2, TM2, RS2, RM2, RM3, RS3, RS4 and RM4 will be open and switches TM1, TS1, RM1 and RS1 will be closed. Thus, the transmitted signal transitions on leads TM and TS into FIG. 10 from the transceiver of FIG. 11 not only will be sent over data link A to the transponder of FIG. 12 but also will pass through the active delay line ADL directly to the receive terminals of the transceiver by way of leads RM and RS in FIG. 10. As will be apparent, these corresponding representative return signal transitions may be either of the same polarity as or of the opposite polarity to the corresponding transmitted signal transitions on leads TM and TS and these signal transients are delayed by the active delay time of the delay line ADL.

In FIG. 10, the switches DEM1 through DEM4, MOD1 and MOD2 are used when the signal format of FIG. 3 is to be used. The functions of these switches will be explained later during the description of the modulator and demodulator circuiry of FIGS. 13 and 14.

It will be recalled from previous descriptions that the loop delay time LD in either FIG. 2 or FIG. 3 is the sum of either (1) the propagation delay times of data links A and B plus the response time of the transponder of FIG. 12 or (2) the delay time of whichever of the delay lines PDL and ADL is being used plus whatever delay time, if any of consequence, is represented by as much of the data loop of FIG. 10 as is actually used.

TRANSCEIVER

Figure 13:
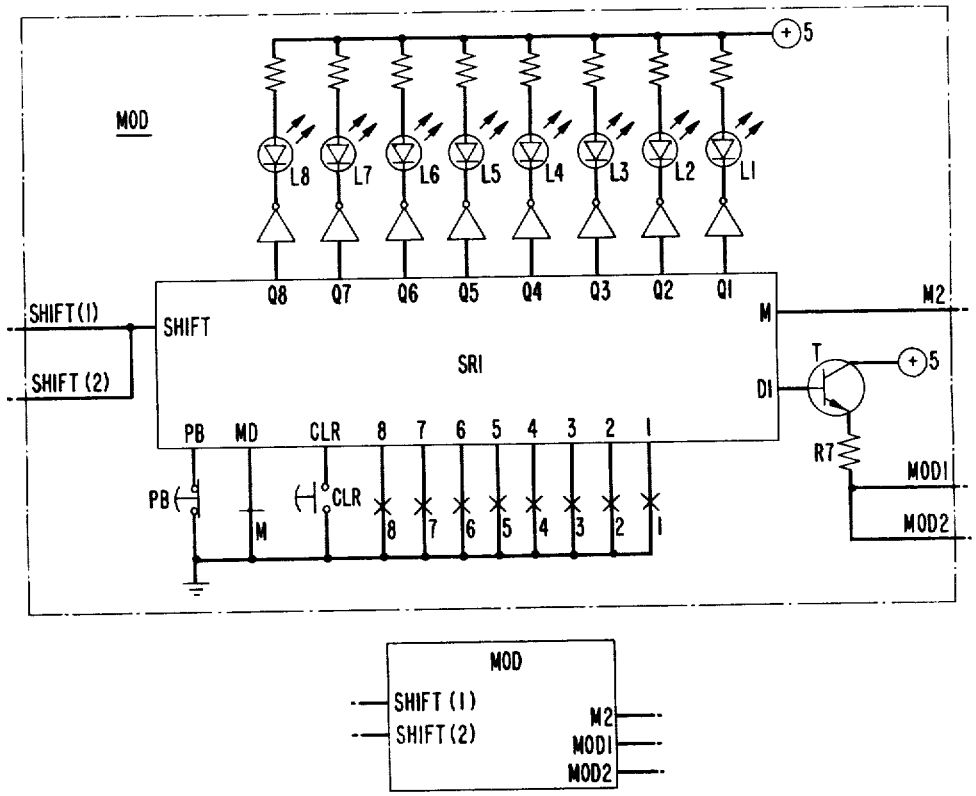
FIG. 13 shows the details of the Modulator circuit of FIGS. 1 and 4.
Figure 14:
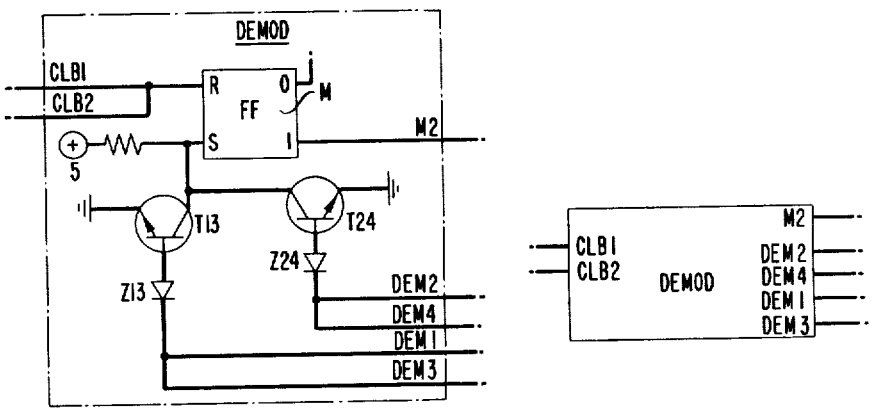
FIG. 14 shows the details of the Demodulator circuit of FIGS. 1 and 4.

In FIG. 11, the condition of the transceiver will be described assuming that a previous transmission has ended with leads EOTV and STOP having gone to H from the input circuit of FIG. 8. The heavy line in FIG. 11 interconnecting the outputs of gates 3-3, 5-5, 3-13 and 12-3 is referred to as the clear rail. As a result of leads EOTV and STOP having gone from L to H from FIG. 8, the following conditions prevail after the transceiver has returned to a condition awaiting another start of transmission signal from the input circuit of FIG. 8. In this regard, it is assumed that the signal format of FIG. 2 is being used. Thus, in FIG. 11, switches MOD and DEM will be open as shown since the modulator and demodulator of FIGS. 13 and 14 are not used. Lead D1 will be H or L from FIG. 8, lead COUNT into FIG. 8 will be L, lead SHIFT into FIG. 8 will be L, lead M into FIG. 8 will be H or L depending upon the condition of FF 11M, lead CLR from FIG. 8 will be L, leads EOTV and STOP from FIG. 8 will be H, lead EOT into FIG. 8 will be L, leads TM and TS into the data loop of FIG. 10 will be H representing a zero current transmit condition, and leads RM and RS from the data loop will be H representing a zero current receive condition. The clear rail will have undergone a H to L transition from the output of one of gates 3-3 and 5-5 to in turn caused FF 2S and FF 2M to be reset so that their outputs 0 are H and their outputs 1 are L. The clear rail will be held L from the output of gate 12-3, one of whose inputs is H from lead STOP and the other of whose inputs is H from the output of gate 12-11. With a L on the output 1 of each of FF 2M and FF 2S, and with a H on the output O of each of FF 2M and FF 2S, the outputs of gates 4-3 and 4-5 will be H, the output of gate 5-7 will be L on the SHIFT lead, and the output of gate 5-9 will be H. Since the clear rail is L, the output of gate 5-3 is H at the R inputs of FF 11M and FF 11S and the output of gate 1-3 is L to hold H the outputs of gates 1-7 and 1-9 at the respective s and R inputs to FF 6 and at the respective S inputs to FF 2M and FF 2S. With input leads RM and RS both H, the output of gate 8-13 is L, the output of gate 8-7 is H, and the output of gate 8-3 is is L at one of the inputs to each of gates 7-12 and 7-13. The outputs of all of gates 7-12, 7-13, 7-3 and 7-5 are H on output leads TM and TS as a zero current transmit condition. Also, since the leads RM and RS are both H, the outputs of both of gates 9-3 and 9-13 are L so that the outputs are H from gates 10-3 and 10-13 at the S terminals of respective ones of FF 11M and FF 11S.

A H to L transition on leads EOTV and STOP from the input circuit of FIG. 8 will cause the transceiver of FIG. 11 to start transmission. Lead EOTV in going L will cause the output of gate 13-13 to go H to in turn cause the output of gate 13-7 to go L to hold H the output of gate 8-7. The L on lead STOP allows the clear rail to go H at the output of gate 12-3 and allows the output of gate 8-9 to go H on lead EOT into the input circuit of FIG. 8 to cause the LED LEOT of FIG. 8 to become lit to signify the start of transmission. When the clear rail goes H, the output of gate 5-3 goes L at the reset terminals R of FF 11M and FF 11S to reset them so that their outputs O are H and their outputs 1 are L, thus causing the output of gate 3-11 to go L and the output of gate 1-13 to go H on the COUNT lead to FIG. 8. Also, the L from the output of gate 5-3 causes the output of gate 1-3 to go H so that the upper inputs to gates 1-7 and 1-9 can sense the value (H or L) on lead D1 from FIG. 8. If lead D1 is H signifying that the first binary digit to be transmitted by the transceiver is a 1, the output of gate 1-7 will go L at the set terminals S of FF 6 and FF 2M to set those circuits so that their outputs 1 are H and their outputs O are L. FF 2S will not be affected since the output of gate 13-3 will be L and the output of gate 1-9 will remain H. When output 1 goes H and output O goes l from FF 2M, the output of gate 4-3 goes L, the output of gate 5-7 goes H on the SHIFT lead into FIG. 8, the output of gate 5-9 goes L, the output of gate 5-3 goes H, and the output of gate 1-3 goes L to return to H the output of gate 1-7. FF 6 is set (output 1 at H and output 0 at L) to remember the binary value 1 of the digit just accepted from FIG. 8 for transmission.

At the time that FF 2M was set (output 1 to H and output 0 to L), the output of gate 7-3 was driven to L on the TM lead toward the data loop of FIG. 10. The H to L on lead TM with lead TS still at H represents a current surge to the data loop of the value +1 in the signal format of FIG. 2 to represent transmission of the binary digit of 1. The instant that the lead TM is made to change from H to L defines the start of time segment T1 in FIG. 2 for the first binary digit of 1 being transmitted.

At this point in time the transceiver is waiting for an indication to appear at its receive terminal that a return signal has been received from the data loop of FIG. 10 corresponding to the signal just transmitted. Leads RM and RS from the data loop of FIG. 10 are both H and the transceiver is waiting to detect one of those leads RM and RS going from H to L. It makes no difference to the operation of the transceiver which of leads RM and RS goes L; so, for illustrative purposes it will be assumed that after the loop delay time LD for time segment T1 of FIG. 2, lead RM goes H to L. The receipt by the transceiver of this H to L transition on lead RM (with lead RS remaining H) from the data loop of FIG. 10 is the receipt of the return signal corresponding to the transmitted H to L on lead TM to define the start of time segment T1 in FIG. 2. Upon detecting the H to L on lead RM, the transceiver will perform circuit functions to end time segment T1, to initiate transmission of the proper signal level for time segment T2, and to allow the return signal to be shifted into the shift register SR1 of the input cirucit of FIG. 8.

Lead RM in going L causes the output of gate 9-3 to go H and the output of gate 10-3 to go L at the set input S to FF 11M to cause its respective outputs 1 and 0 to go to H and L. The H output 1 from FF 11M appears on lead M into FIG. 8 as the signal to be shifted into SR1 of FIG. 8, when the time comes, as the value of the return signal. When output 0 of FF 11M goes L with output 0 of FF 11S still H, the output of gate 3-11 goes H to cause the output of gate 1-13 to go L on the COUNT lead into FIG. 8 so that the counter CTR of the input circuit of FIG. 8 can register the count of the first digit transmission. The L from the output of gate 1-13 also appears at the upper input to gate 10-3 to return to H the S input of FF 11M at the output of gate 10-3.

The H to L transition from the output of gate 1-13 also appears at the toggle limit T of FF 2M and FF 2S to cause these circuits to toggle their outputs. That is, outputs 1 and 0 of FF 2M change from respective H and L to L and H and outputs 1 and 0 of FF 2S change from respective L and H to H and L. The H to L at output 1 of FF 2M causes the output of gate 7-3 to go L to H on lead TM and the L to H at output 1 of FF 2S causes the output of gate 7-5 to go H to L on lead TS. This change of respective leads TM and TS from respective L and H to respective H and L defines the end of time segment T1 and the start of time segment T2 and represents, by the reversal of current into the data loop of FIG. 10 (that is, from +1 to −1 in FIG. 2), the correlate signal of −1 for the value signal of +1 transmitted during time slot T1. The transceiver then waits for the receipt on leads RM and RS of the return signal corresponding to the change in transmitted signal level at the end of time segment T1.

After the loop delay time LD for time segment T2 of FIG. 2, leads RM and RS incoming to FIG. 11 from the data loop of FIG. 10 will change from respective L and H to respective H and L according to the signal format of FIG. 2. The L to H on lead RM and the H to L on lead RS cause the outputs of respective gates 9-3 and 9-13 to go H to L and L to H. The H output of gate 9-13 also causes the output of gate 3-3 to go H to L on the clear rail. The H to L on the clear rail appears at the reset input R of FF 2S to reset this circuit so that its 1 output is L and its 0 output is H. FF 2M will not be affected by the H to L at its input R since its output 1 and 0 are already at respective L and H. The L on the clear rail appears at the lower inputs to gates 7-3 and 7-5 so that output lead TM stays H and output lead TS is changed from L to H. The return to H of lead TS defines the end of time segment T2 and the start of time segment T3 with the transmitted signal being at the zero level as represented by the fact that both of leads TM and TS are H toward the data loop of FIG. 10. At the time that FF 2S is reset, the outputs 0 of FF 2M and FF 2S are both H and the outputs of gates 4-3 and 4-5 both become H so that the output of gate 5-7 becomes H to L on the SHIFT lead into the input circuit of FIG. 8, to cause the shift of data in the shift register SR1 of FIG. 8 with the H on lead M being shifted into the last digit position in SR1 of FIG. 10 according to the assumed return signal representing the binary digit of 1. The L output of gate 5-7 causes the output of gate 5-9 to go L to H but the output of gate 5-3 remains H due to the L on the clear rail at the lower input to gate 5-3. The transceiver remains in its present condition waiting for a return signal on leads RM and RS corresponding to the signal change that occurred on leads TM and TS at the start of time segment T3.

At the end of the loop delay time LD for time segment T3, input lead RS will go from L to H so that with lead RM still at H the return signal from the data loop of FIG. 10 is a change back to the zero level as the return signal for the transmitted change back to the zero level during time segment T3.

The L to H on the receive lead RS causes the output of gate 9-13 to go L to in turn cause the output of gate 3-3 to return to H on the clear rail. The H on the clear rail causes the output of gate 5-3 to go H to L at the reset input R of FF 11M to cause the outputs 1 and 0 of the latter to change respectively from H to L and from L to H. At the same time, the H to L output of gate 5-3 causes the output of gate 1-3 to go H to allow the signal level on lead D1 from the input circuit of FIG. 8 to pass through one of gates 1-7 and 1-9 depending upon whether the signal on lead D1 is respectively H or L. If the signal on lead D1 is H, the output of gate 1-7 will go H to L; and, if the signal on lead D1 is L, the output of gate 13-3 will go H to allow the output of gate 1-9 to go H to L. It will be recalled that the signal on lead D1 from FIG. 8 is that which signifies the value of the second binary digit to be transmitted since a shift has occurred in SR1 of FIG. 8 at about the end of time segment T2 during transmission of the first digit. As a result of having reset FF 1M so that its output 1 is L, that L appears on lead M into FIG. 8. Also, since the outputs 0 of FF 11M and FF 11S are both H, the output of gate 1-13 is made H on the COUNT lead into FIG. 8.

If it is assumed that the second digit to be transmitted is a 0 according to the format of FIG. 2, lead D1 into FIG. 11 from the input circuit of FIG. 8 will be L so that the output of gate 1-9 goes H to L at the reset input R of FF 6 and at the set input S of FF 2S. The H to L at the R input to FF 6 resets the latter so that its respective outputs 1 and 0 become L and H to reflect the presently transmitted value of binary 0. The H to L at the S input to FF 2S sets the respective outputs 1 and 0 thereof from L to H and from H to L. The change in the condition of outputs 1 and 0 of FF 2S causes the output of gate 7-5 to go from H to L on lead TS and causes the output of gate 5-7 to go H on the SHIFT lead into FIG. 8, the H on the output of gate 5-7 also causing the output of gate 5-3 to return L to H. The H output of gate 5-3 causes the output of gate 1-3 to go L to inhibit gates 1-7 and 1-9 so that their outputs both become H again.

As a result of the above-described functions, which occur at the start of time segment T1 for the second transmitted digit, the assumed second digit of zero according to FIG. 2 is represented by lead TM at H with lead TS going from H to L into the data loop of FIG. 10 so that the transmitted signal is −1 to represent binary 0. Also, the leads COUNT and SHIFT into the input circuit of FIG. 8 have been rendered H in preparation for the subsequent H to L transitions on these leads for control of the shift register SR1 of FIG. 8 as has been described.

It is considered unnecessary to repeat the above details for the transmission of each successive digit and for the receipt of return signals for those transmissions. The above-described process continues for each transmitted digit with the following results: during time segment T1 for each transmitted binary digit, the signal level changes from zero to +1 for binary 1 and from zero to −1 for binary 0, these two signal level changes being represented respectively by TM going H to L with TS at H and by TM at H with TS going from H to L; during time segment T2, the transmitted signal level changes to the opposite of the signal level during time segment T1 so that the resulting signal levels during time segments T1 and T2 are the coorelate of each other; and, the signal level during time segment T3 changes back to the zero level to represent the end of transmission of the digit.

The signal format of FIG. 2 shows that the general rule of having a change back to the zero signal level during time segment T3 for each digit transmission time slot is violated during time segment T3 for the last digit transmitted. This is a preferred signal format so that the last time segment T3 will contain a signal change that not only will represent the end of a digit transmission time slot but also will distinguish the end of the time slot for an initial digit from the end of the time slot for the last digit. In this regard, the transceiver of FIG. 11 is arranged, during time segment T3 for the last transmitted digit, to use a change to the same signal level as was used during time segment T1 for the same digit. The functioning of FIG. 11 will be described presently to show how this special situation comes about.

As has been fully described above, during the early part (before the end of the loop delay time LD) of time segment T1 for transmission of the value signal for the last digit to be transmitted, the following conditions will prevail in the transceiver of FIG. 11 assuming that the last transmitted digit is binary 1 according to the format of FIG. 2. FF 2M is set with its respective outputs 1 and 0 at H and L; FM 2S is reset with its respective outputs 1 and 0 at L and H; the clear rail is H at the lower inputs to gates 7-3 and 7-5 so that leads TM and TS are respectively H to L and H into the data loop of FIG. 10 as a signal of +1 to represent the value of binary 1; FF 6 will be set with its respective outputs 1 and 0 at H and L to remember the value of the signal transmitted during time segment T1; the COUNT and SHIFT leads into FIG. 8 will both be at H; leads RM and RS are both H according to the zero level of return signal from the data loop of FIG. 10; FF 11M and FF 11S are reset with their outputs 1 at L and their outputs 0 at H; and, the M lead is L into FIG. 8.

When the return signal occurs on one of leads RM and RS, at the end of the loop delay time LD from the start of the time segment T1 for the last transmitted digit time slot, the return signal will represent either a binary 0 or a binary 1. Assuming that the return signal represents a binary 1, lead RM will go H to L (with lead RS remaining H), thus to cause the output of gate 9-3 to go to H, which in turn causes a H to L transition at the output of gate 10-3 at the set input S of FF 11M. The respective outputs 1 and 0 of FF 11M then go to H and L to cause the COUNT lead into FIG. 8 to go from H to L for the eighth time to signify that the transceiver is transmitting the last or eighth digit.

In FIG. 8, counter CTR will respond to the H to L transition on lead COUNT from FIG. 11 to arrive at a count of eight with its output QD going from L to H such that the output of gate G3 in FIG. 8 goes L to H on leads STOP and EOTV into FIG. 11. In the meantime, the H to L on the COUNT lead in FIG. 11 causes FF 2M and FF 2S to toggle so that outputs 1 and 0 of FF 2M become L and H and so that outputs 1 and 0 of FF 2S become H and L. This toggle of FF 2M and FF 2S, as has been discussed, reverses the condition of leads TM and TS so that these leads become respectively H and L into the data loop of FIG. 10 to define the end of time segment T1 and the start of time segment T2.

In FIG. 11, the H on lead EOTV from FIG. 8 renders L the ouput of gate 13-13 to prevent the output of gate 13-7 from holding L the left-most input to gate 8-7, as has been the situation up to this point. Since lead RM is L and lead RS is H, the output of gate 8-13 become H at the left-most input to gate 8-7. At this point, with the clear rail at H, the transceiver waits for the return signal at the end of the loop delay LD from the start of time segment T2 of the transmission time slot for the last transmitted digit.

When the return signal arrives from the data loop of FIG. 10, it will be represented by a reversal of the condition of the receive leads RM and RS such that lead RM goes from L to H and lead RS goes from H to L. This causes the outputs of respective gates 9-3 and 9-13 to go respectively from H to L and from L to H. The output of gate 3-3 then goes L on the clear rail as previously described. The output of gate 9-7 goes H at the right-most input to gate 8-7 so that the output of gate 8-7 now goes to L and the output of gate 8-3 goes to H at the lower inputs to gates 7-12 and 7-13. In the meantime, the H to L transition on the clear rail will have reset FF 2S so that its outputs 1 and 0 are respectively L and H. The reset conditions of FF 2M and FF 2S (outputs 1 at L and outputs 0 at H), as previously described, will tend to return the transmit lead TM and TS to H according to the usual change back to zero level during time segment T3. However, with the output H from gate 8-3 at the lower inputs of gates 7-12 and 7-13, the latter gates can pass to leads TM and TS whatever has been remembered in FF 6. It will be recalled that FF 6 will have been set (output 1 at H and output 0 at L) according to the fact that the value signal transmitted during time segment T1 was a change from zero to +1 represented by TM going H to L with TS at H. The H on the 1 output of FF 6 makes the output of gate 7-12 go to L on lead TM to define the end of time segment T2 and the start of time segment T3. Thus, the transmitted signal during time segment T3 for the last transmitted time slot is a change to the same level as the signal change during time segment T1 rather than the change back to the zero level as in the case of all initial transmitted digits.

At the time that FF 2S was reset, the output of gate 5-7 was made to go H to L on the SHIFT lead toward the input circuit of FIG. 8 to cause the final shift in shift register SR1 of FIG. 8. In this regard, as has been explained, the shift register SR1 of FIG. 8 will contain the eight return signals which will be visually displayed by the LEDs L1 through L8.

When the return signal is received from the data loop of FIG. 10, after the passage of the loop delay LD from the start of time segment T3, lead RS will return to H so that with lead RM also H the received signal is a change back to the zero level. As the result of lead RS returning to H, the output of gate 9-13 returns to L and the output of gate 8-13 returns to L. This causes the output of gate 8-7 to go to H and the output of gate 8-3 to go to L to return lead TS to H so that the transmit signal is once again at the zero level with both of leads TM and TS at H toward the data loop of FIG. 10. In the meantime, when the output of gate 8-7 became H, the output of gate 8-9 became L on lead EOT into FIG. 8 so that the LED LEOT in FIG. 8 became extinguished as an indication that the end of transmission has been reached, specifically signifying the end of transmission of the group of eight binary digits originally set up in the shift register SR1 of FIG. 8.

At this point the transceiver of FIG. 11 will have finished transmitting the group of eight digits and will wait for another H to L signal on leads EOTV and STOP from the input circuit of FIG. 8 to initiate transmission of more data. Leads TM and TS are both H toward the data loop of FIG. 10 as a zero level signal; leads RM and RS are both H from the data loop as a zero level signal; leads EOTV and STOP are both H from the input circuit of FIG. 8; the clear rail is held L from the output of gate 12-3; the EOT lead to the input circuit of FIG. 8 is held L from the output of gate 8-9; the COUNT lead toward the input circuit is held L from the output of gate 1-13; the SHIFT lead toward the input circuit is held L from the output of gate 5-7; FF 2M and FF 2S are reset with their outputs 1 at L and their outputs 0 at H.

In the data loop of FIG. 10, if either the passive delay line PDL or the active delay line ADL is being used to provide return signals to leads RM and RS of the transceiver of FIG. 11, the return signal corresponding to the reversal of leads TM and TS at the start of time segment T3 for the last digit transmission will not be a change to the zero level as assumed in the foregoing description. The foregoing description assumed that the return signals were being received from the data loop of FIG. 10 as supplied to the data loop from a transponder of FIG. 12. It will be recalled that in the previously assumed situation the last return signal was a change back to the zero level with the receive leads RM and RS in FIG. 11 both becoming H.

In the case of the delay lines of the data loop of FIG. 10, there are no return signals supplied from a transponder of FIG. 12. Instead, the return signals supplied to the transceiver of FIG. 11 are signal transients caused by the transmitted signals having been suitably delayed in a delay line. All of the previous description of transceiver functioning applies (except as mentioned below) as well to the delay line situation as it does to the situation whereunder the return signals are supplied from a transponder. The one exception is the return signal corresponding to the signal transmitted during time segment T3 for the last time slot transmission. In the case of the delay lines, that return signal will be a reversal of the conditions of the receive leads RM and RS of FIG. 11 because the transmitted signal transition at the start of that last time segment T3 was a reversal of the conditions of the transmit leads TM and TS of FIG. 11. When the reversal condition of leads RM and RS occurs, one of the leads will go L to H and the other will go H to L so that in FIG. 11 the output of gate 8-13 remains H so that it cannot cause the output of gate 8-3 to go L to cause leads TM and TS to both become H for a change back to the zero signal condition. However, the output of one of gates A-5 and B-5 will be made L to accomplish the same task.

The bottom input to each of gates A-5 and B-5 will be H from the H on lead EOTV from the input circuit of FIG. 8. The next-to-bottom input of each of gates A-5 and B-5 will be H from the output of gate 12-11 due to the L on the clear rail. During transmit time segment T1, when the return signal appeared on leads RM and RS, one of the FF 11M and FF 11S would have been set so that its output 1 was made H and its output 0 was made L with the other of FF 11M and FF 11S having remained in a reset condition with its output 1 at L and its output 0 at H. Assuming that FF 11M was the one that had been set (output 1 at H and output 0 at L), such would have resulted from a receive condition where lead RM was H with lead RS going H to L. Under this condition, the uppermost input of gate A-5 would have been L from the output of gate 9-3, the uppermost input of gate B-5 would have been H from the output of gate 9-13, the next-to-uppermost input to gate A-5 would have been H from the 1 output of FF 11M, and the next-to-uppermost input to gate B-5 would have been L from the 1 output of FF 11S. Under these circumstances, the outputs of gates A-5 and B-5 could not go to L. However, when the return signal reversal takes place on leads RM and RS so that RM goes H to L and RS goes L to H, the outputs of gates 9-3 and 9-13 change respectively from L to H and from H to L. The upper input to gate A-5 thus becomes H to allow the output of gate A-5 to go L at the lower inputs to gates 7-12 and 7-13 to return the transmit leads TM and TS both to H to represent a change back to the zero level of transmission, thus to end transmission of the group of digits.

If the reverse situation had occurred regarding the last return signal from the data loop of FIG. 10, gate B-5 would have provided an L output instead of gate A-5. In either case, the transmit condition of a change back to the zero level (leads TM and TS both at H) at the end of the last time segment T3 eventually appears at the receive leads RM and RS as a change back to the zero level signal (leads RM and RS both at H) to end the process.

The functioning of the transceiver of FIG. 11 when using the double level signal format of FIG. 3 will be described later in connection with the descriptions of the modulator and demodulator circuits of FIGS. 13 and 14.

As has been discussed previously in connection with the input circuit of FIG. 8, lead EOTV in FIG. 8 is preferably connected to lead STOP in FIG. 8 over switch S1 in its position 1. The previous description of the functioning of the transceiver of FIG. 11 assumed that such preferred arrangement was in use. In that regard, it will be recalled that at the start of time segment T3 of the last transmission time slot, the output of gate 8-7 in FIG. 11 was caused to go L so that the output of gate 8-3 in FIG. 11 would go H to enable gates 7-12 and 7-13 to adjust leads TM and TS to the same polarity (that is, +1 or −1) signal level during time segment T3 as was present during time segment T1. If switch S1 in FIG. 8 is put into its position 2, the lead EOTV into FIG. 11 will be grounded and thus will remain L all of the time. This L on lead EOTV is reflected through gates 13-13 and 13-7 as a continuous L at the left input to gate 8-7, the resulting continuous H output of gate 8-7 thus holding L the output of gate 8-3 at the lower inputs to gates 7-12 and 7-13. Since the lower inputs to gates 7-12 and 7-13 are held L all of the time, the outputs of gates 7-12 and 7-13 cannot reflect onto leads TM and TS the polarity of signal remembered in FF 6; and, thus during time segment T3 of the last transmission time slot, the transmitted signal will be a change back to the zero level as in the case of time segments T3 of all of the initial transmission time slots. Such an arrangement allows the transmission of groups of data without the end-of-group signal if such an arrangement is desired. As mentioned previously, the latter is not the preferred situation.

In FIG. 8, if pushbutton switch CL is momentarily operated at any time, lead CLR will exhibit an L to H to L set of transitions into the transceiver of FIG. 11. In FIG. 11, an L to H on lead CLR causes the clear rail to go to L at the output of gate 3-13. The H to L on the clear rail at the reset inputs R of FF 2M and FF 2S (1) will reset these circuits so that their outputs 1 are L and their outputs 0 are H and (2) will cause both of output leads TM and TS to be H toward the data loop of FIG. 10. When the clear rail returns L to H upon the release of pushbutton CL in FIG. 8, gate 5-3 in FIG. 11 will provide a H to L output to reset FF 11M and FF 11S so that their outputs 1 are L and their outputs 0 are H. Thus, the transceiver of FIG. 11 may be reset at any time by a momentary operation of pushbutton CL in the input circuit of FIG. 8.

TRANSPONDER

As has been described previously, the output circuit of FIG. 9 will have been set so that each of the outputs Q1 through Q8 of the shift register SR1 will be H or L according to the assumption that an eight item binary number has been entered into SR1 for transmission to the transceiver of FIG. 11 by the transponder of FIG. 12 as a series of return signals corresponding to an eight item binary number transmitted from the transceiver to the transponder. Also, the signal format of FIG. 2 is used since it is also assumed, as an example at the outset, that the eight items of each transmission are eight single digit binary numbers. The functioning of the transponder when the signal format of FIG. 3 is used will be explained later. Also, in FIG. 12, switches C and D will be closed so that the transponder can supply return signals to the data loop of FIG. 10; and, switches MOD and DEM will be open since the modulator and demodulator of FIGS. 13 and 14 are not used with the signal format of FIG. 2.

The following conditions prevail in the transponder of FIG. 12 as representative of the idle condition, such as would obtain, as will be seen from subsequent description, at the end of a previous transmission from the transceiver of a group of binary items. Leads A and B from the data loop of FIG. 10 are both H to represent a zero signal level input to the transponder. Leads C and D to the data loop are both H to represent a zero signal level output from the transponder. Due to the fact that leads A and B are both H, the clear rail at the output of gate 1-7 will be L. FF 4A, FF 4B, FF C, FF D, FF 10M and FF 10S will be reset with their outputs 1 at L and their outputs 0 at H. FF E will be set with its output 1 at H and its output 0 at L. The outputs of the following gates will be H: 13-3, 13-13, 3-3, 5-7, 3-9, 5-9, 3-13, 3-7, 2-5, 2-11, 8-3, 14-3, 14-11, 15-3 (on lead C), 15-11 (on lead D), 9-3, 9-13, 11-9 and EOTR. The outputs of the following gates will be L: 1-3 (from the H on lead A), 1-13 (from the H on lead B); 1-7 (on the clear rail), 9-9, 11-7, 5-3, EOTP, 5-13, 7-3, 2-13 and 9-7. The M lead into FIG. 9 will be L from output 1 of FF 4A. Lead EOTP into FIG. 9 is L from the output of gate EOTP. Lead EOTR into FIG. 9 is H from the output of gate EOTR. The SHIFT lead into FIG. 9 is H from the output of gate 11-9. Lead D1 from FIG. 9 will be either H or L depending upon the condition in FIG. 9 of output D1 (and Q1) of shift register SR1.

In FIG. 9, FF EOT will be set with its output 1 at H and its output 0 at L so that LED LEOTP is extinguished to indicate that the transponder of FIG. 12 is in an idle condition. It will be assumed, by example, that the shift register SR1 of FIG. 9 has been set up to prescribe a group of single binary digit numbers, the signals representative of which are to be transmitted by the transponder to the transceiver as return signals corresponding to the signals which will be transmitted to the transponder from the transceiver. In this regard, the lower curve in FIG. 2 may be taken as an example of return signals from the transponder. The same examples may be assumed here as were assumed earlier under the discussion of the input and output circuits of FIGS. 8 and 9. These assumptions are that the transceiver of FIG. 11 will transmit the series of binary digits 10011011 to the data loop of FIG. 10 and that the transponder of FIG. 12 will transmit the series of binary digits 01011100 to the data loop. In FIG. 9, the shift register SR1 will therefore be set so that its outputs Q1 through Q8 are as follows: Q1 is L (=0), Q2 is H (=1), Q3 is L (=0), Q4 is H (=1), Q5 is H (=1), Q6 is H (=1), Q7 is L (=0) and Q8 is L (=0) to correspond to the assumed respective digits 01011100 to be transmitted by the transponder. It will be understood, of course, that the time slot in FIG. 2 for each of the return signal items received by the transceiver are actually time slots generated by the transponder and include the same three time segments T1, T2 and T3 as are particularly identified as such in FIG. 2 for the transceiver transmit signals. Again, in FIG. 9, LEDs L2 and L4 through L6 will be lighted and LEDs L1, L3, L7 and L8 will be extinguished so as to visually display the data stored in shift register SR1. Also, as has been mentioned, lead D1 from FIG. 9 into the transponder of FIG. 12 will be at the same signal level as the Q1 output of SR1 in FIG. 9, which at the above assumed starting condition is L. Under the latter condition, in FIG. 12, the output of gate 12-3 will be H.

The transponder of FIG. 12 waits in the above condition for an incoming signal on leads A and B. According to the assumed situation, the first digit to be received from the transceiver by way of the data loop of FIG. 10 is the digit of binary 1 which is assumed to be represented by input lead A going H to L with input lead B remaining H. This signal is received in FIG. 12 after whatever delay has been incurred through the data loop since the beginning of time segment T1 of the transceiver transmission.

When input lead A goes H to L with input level B remaining H, the outputs of gates 1-3 and 1-7 go to H. The L to H from the output of gate 1-3 is reflected through gate 3-3 as a H to L at the set input S of FF 4A to cause its respective outputs 1 and 0 to go L to H and H to L. The H on the 1 output of FF 4A appears on lead M into FIG. 9 so that, as will be explained, the first digit received from the data loop can be shifted into the Q8 output of SR1 in FIG. 9 when the time comes. The H to L at output 0 of FF 4A causes the output of gate 7-3 to go L to H and this transition is reflected through gate 3-7 as a H to L at the lower input to gate 3-3 to return the S input of FF 4A to H. The L to H at the output of gate 7-3 also appears at the lower input to gate 8-3 to cause the output of gate 8-3 to go H to L at the reset input R of FF E and at the inputs to gate 9-9. The H to L at the R input to FF E resets FF E so that its output 0 is made H and so that the output of gate EOTR is made L on lead EOTR into FIG. 9. In FIG. 9, the H to L on lead EOTR from FIG. 12 resets FF EOT so that its output 1 is made L to light LED LEOTP to indicate a busy condition of the transponder. In the meantime, the H to L at the input to gate 9-9 in FIG. 12 causes its output to go L to H at the upper input to gate 9-13 and at the lower input to gate 9-3. With lead D1 at L from FIG. 9, the H output of gate 12-3 at the lower input to gate 9-13 allows a H to L to occur at the output of gate 9-13 at the set input S of FF 10S to cause the respective outputs 1 and 0 of FF 10S to go L to H and H to L. The L to H from the 1 output of FF 10S causes the output of gate 15-11 to go H to L on lead D toward the data loop and causes the output of gate 14-3 to go L to H at the upper input to gate 9-7; and, the H to L from the output 0 of FF 10S appears at the middle input to gate 9-7. The output of gate 9-7 goes L to H and the latter is reflected through gate 8-13 as a H to L at the lower input to gate 9-3 and at the upper input to gate 9-13, the latter returning input S of FF 10S to H.

The transponder remains in the foregoing condition until the next input signal transition occurs on input leads A and B from the data loop of FIG. 10 as a result of the transceiver of FIG. 11 having transmitted the reversal signal transition at the end of its transmission time segment T1. Also, until the next such input transition occurs, the transponder will continue to transmit to the data loop of FIG. 10 the return signal (lead C at H with lead D at L) corresponding to the initially received first input transition.

In FIG. 2, at the end of the loop delay LD (from the start of the transceiver's time segment T1) the return signal from the transponder will have arrived at the transceiver resulting, as has been described, in the transceiver having caused a signal reversal on its transmit terminal, the latter being detected on the transponder input leads A and B after whatever delay is incurred through the data loop of FIG. 10. At that point in time input lead A will go L to H and lead B will go H to L in FIG. 12.

As the result of the reversal of the input leads A and B four significant actions take place in FIG. 12: (1) the FF C is set; (2) a H to L transition is supplied over lead SHIFT into FIG. 9; (3) the output circuit of FIG. 9 supplies the next value on lead D1 into FIG. 12; and, the output leads C and D into the data loop of FIG. 10 are reversed as to signal level.

The H to L on input lead B causes a L to H at the output of gate 1-13 at the left input to gate 2-5, the right input of which is H from the 1 output of FF 4A; thus, the output of gate 2-5 goes H to L at the set input S of FF C to cause the 0 output of the latter to go H to L. The H to L from output 0 of FF C is reflected as an L to H at the output of gate 2-13 at the upper input to gate 5-9 and at the lower input to gate 5-7. The outputs of gates 5-7 and 5-9 remain H since (1) the upper input to gate 5-7 is L due to the H to L from gate 1-3 due to the L to H on input lead A and (2) since the lower input to gate 5-9 is L from the 1 output of FF 4B.

The H to L output of gate 2-5 is also reflected through gates 11-7 and 11-9 as a H to L on lead SHIFT into FIG. 9. In FIG. 9, the H to L on lead SHIFT brom FIG. 12 causes a shift of the data in shift register SR1 just as previously described regarding shift register SR1 of the input circuit of FIG. 8. As a result of that shift in shift register SR1 of FIG. 9, the outputs Q8, Q7, Q6, Q5, Q4, Q3 and Q2 shift to respective outputs Q7, Q6, Q5, Q4, Q3, Q2 and Q1 and the H on lead M into FIG. 9 from FIG. 12 shifts into SR1 and appears at output Q8. Thus, the first value (H = 1) received by the transponder from the transceiver by way of the data loop of FIG. 10 is stored on output Q8 of SR1 in FIG. 9 and output Q1 (and output D1) of SR1 in FIG. 9 is now H according to the second digit of 1 originally set up on output Q2. The H on lead D1 from FIG. 9 into FIG. 12 now appears at the inputs to gate 12-3 and at the upper input to gate 9-3 as the next item of data to be sent over leads C and D into the data loop as a return signal. The outputs of gates 9-3 and 9-13 remain H at the set inputs S of FF 10M and FF 10S since the lower input to gate 9-3 and the upper input to gate 9-13 are held L from the output of gate 8-13.

In the meantime, the H to L output of gate 2-5 also appears at the toggle inputs T of FF 10M and FF 10S to cause these circuits to reverse the conditions of their 1 and 0 outputs: respective outputs 1 and 0 of FF 10M go L to H and H to L; and, respective outputs 1 and 0 of FF 10S go H to L and L to H. The H to L at the upper input to gate 15-11 causes the output of gate 15-11 to go L to H on lead D toward the data loop of FIG. 10; and, the L to H at the upper input to gate 15-3 causes the output of gate 15-3 to go H to L on lead C toward the data loop. This reversal of the condition of leads C and D is the return signal corresponding to the signal reversal on input leads A and B in FIG. 12 received by the transponder from the transceiver by way of the data loop of FIG. 10.

The transponder of FIG. 12 is at the point in time which in FIG. 2 represents the early part of time segment T2 of the transceiver's first transmission time slot. Eventually, as previously described, the transceiver of FIG. 11 will receive the return signal from the data loop of FIG. 10 and will thereupon transmit to the data loop the change back to the zero level signal during time segment T3 of that first transmission time slot. The latter will be recognized by the transponder on input leads A and B in FIG. 12 so that the transponder can thereupon supply the corresponding change back to the zero level return signal over leads C and D into the data loop of FIG. 10.

In FIG. 12, the change back to the zero level signal from the data loop of FIG. 10 is manifested by input lead A remaining H and by input lead B going from L to H. This condition causes three significant events to occur in the transponder of FIG. 12: lead M into FIG. 9 is made to go H to L to the shift register SR1 of the output circuit of FIG. 9; the SHIFT lead into FIG. 9 is made to go L to H to prepare for a subsequent H to L shift on lead SHIFT into FIG. 9 for shifting the data through shift register SR1; and, output lead C from FIG. 12 into the data loop of FIG. 10 is returned from L to H so that both of leads C and D into FIG. 10 will be H to provide a change back to the zero level return signal corresponding to the change back to the zero level signal received from the data loop on leads A and B in FIB. 12.

The L to H on lead B causes a H to L at the output of gate 1-13 and a L to H at the output of gate 13-13 since the output of 13-3 can also go H due to the L from the output of gate 1-3. With all of its inputs at H, the output of gate 1-7 goes H to L on the clear rail at the reset inputs R of FF 4A and FF 4B and at the upper input to gate 8-3. The L to H output of gate 8-3 renders H the reset input R of FF E and allows the output of gate 9-9 to hold L the lower input to gate 9-3 and the upper input to gate 9-13. The H to L at the reset input R of FF 4B has no effect on FF 4B since it is already reset (output 0 is H and output 1 is L). The H to L at the reset input R of FF 4A causes the latter to become reset so that its output 1 goes H to L and its output 0 goes L to H. The H to L of output 1 of FF 4A appears as a H to L on lead M into FIG. 9 so that the M lead will now be at L. In the meantime, the H to L output from gate 1-13 causes the output of gate 2-5 to go L to H and the latter is reflected through gates 11-7 and 11-9 as a L to H on the SHIFT lead into FIG. 9. When the output 1 of FF 4A went H to L at the right input to gate 2-5, the output of gate 2-5 was thereby held H. When the output 0 of FF 4A was made to go L to H, the output of gate 5-13 was made H to L at the reset input R of FF D; but, FF D is not affected since it is already in a reset condition (output 0 at H and output 1 at L). However, the L to H at the right input to gate 7-3 causes the output of gate 7-3 to go H to L at the reset inputs R to FF 10M and FF 10S and at the lower inputs to gates 15-11, 15-3 and 8-3. The L at the lower input to gate 15-3 causes its output on lead C to go L to H so that leads C and D are both H to reflect a change back to the zero level signal into the data loop of FIG. 10. The H to L at the reset input R of FF 10S has no effect since FF 10S is already in a reset condition (output 0 at H and output 1 at L); but, the H to L at the reset input R of FF 10M causes it to be reset so that its outputs 1 and 0, respectively, go H to L and L to H. With both of FF 10M and FF 10S reset (outputs 1 at L and outputs 0 at H), a H to L is produced at the output of gate 9-7 at the reset input R to FF C to cause the output 0 of the latter to go L to H, which is reflected through gate 2-13 as a H to L at the lower input to gate 5-7 and at the upper input to gate 5-9, thus maintaining at H the outputs of gates 5-7 and 5-9. The output of gate 8-13 is prevented from going H due to the L output of gate 9-9.

The transponder of FIG. 12 waits in the foregoing condition until a change in the condition of input leads A and B in FIG. 12 represents the receipt by the transponder of the next signal from the data loop of FIG. 10, which next signal will be a change from zero level to the value signal level (+1 or −1 in FIG. 2) representing the value of the next binary digit of 0 or 1 transmitted by the transceiver of FIG. 11 during time segment T1 of the second transmission time slot. As the transponder of FIG. 12 waits for a signal on its input leads A and B, the following circuit conditions prevail in FIG. 12: input leads A and B are both H since the received signal level is zero; output leads C and D are both H since the return signal level is zero; lead M is L into the output circuit of FIG. 9 waiting for an indication from FF 4A as to the value of the next digit to be received; input lead D1 from the output circuit of FIG. 9 is H to represent the value of binary 1 for the next digit to be sent over leads C and D as a return signal to the data loop of FIG. 10; and, output lead SHIFT is H into FIG. 9 in preparation for the next shifting operation in shift register SR1 of FIG. 9.

The above process is repeated for each of the first seven transmission slots during which seven digits are transmitted by the transceiver of FIG. 11 to the transponder of FIG. 12 through the data loop of FIG. 10 and during which seven digits are returned from the transponder to the transceiver. As has been described previously in connection with the transceiver of FIG. 11, and as depicted in the upper curve of FIG. 2, the usual signal format, where time segments T3 usually contain a change back to the zero signal level, is violated during time segment T3 for the last transmission time slot of the transceiver by the latter transmitting a change to the same signal level during time segment T3 as during time segment T1 for that last transmission time slot.

Assuming for purposes of discussion that the last digit to be received from the transceiver of FIG. 11 by way of the data loop of FIG. 10 is binary 1, assuming that the last return digit to be transmitted back to the transceiver by way of the data loop is binary 1, and assuming that the transponder of FIG. 12 is waiting for a signel change on its input leads A and B to signify the end of time segement T2 of the last transmission time slot from the transceiver, the following conditions will prevail in FIG. 12: input leads A and B are respectively H and L during time segment T2 from the transceiver by way of the data loop; FF 4A is set with its output 1 at H and its output 0 at L; FF C is set with its output 0 at L; the output of gate 11-9 is L on lead SHIFT; FF 10M is set with its output 1 at H and its output 0 at L; FF 10S is reset with its output 1 at L and its output 0 at H; the outputs of gates 15-3 and 15-11 are respectively L and H on leads C and D during time segment T2 toward the transceiver by way of the data loop; and, FF E is in the reset condition with its output 0 at H.

When the prior H to L occurred on lead SHIFT into FIG. 9, as previously described, the H on lead M into FIG. 9 will have been shifted onto output Q8 of SR1 in FIG. 9 as the value of the last value signal received from the data loop of FIG. 10. Also, the respective outputs Q7 through Q1 of SR1 in FIG. 9 will be set H or L according to the previously received initial value signals received from the data loop; and, the LEDs L1 through L8 will have visually indicated the eight received binary digits.

The lead D1 from FIG. 9 into the transponder of FIG. 12 will now be H or L from the Q1 output of SR1 in FIG. 9 according to the first value signal previously received from the transceiver by way of the data loop.

Leads EOTP and EOTR are both L from the outputs of respective gates EOTP and EOTR in FIG. 12. As will be recalled, these L leads EOTP and EOTR extend into FIG. 9 where FF EOT is in a reset condition with its output 1 at L causing a lighted LED LEOTP to indicate a busy condition of the transponder of FIG. 12.

In the above condition, the transponder waits for a signal change on its input leads A and B. During the reception by the transponder from the data loop of the seven initial digits, gates 5-7 and 5-9 have maintained their outputs H so that FF D has reamined reset (output 1 at L and output 0 at H). Thus, the output of gate 3-9 has remained H so that FF E has remained reset (output 0 at H). Gates 5-7 and 5-9 constantly monitor for a signal format violation during reception by the transponder of the signal level change during time segment T3 from the transceiver by way of the data loop. In the presently assumed situation, the upper input to gate 5-7 is L from the output of gate 1-3 due to the H on input lead A, the middle input to gate 5-7 is H from the 1 output of FF 4A on the M lead, and the bottom input to gate 5-7 is H from the output of gate 2-13 due to the L on the 0 output of FF C. Also, in the presently assumed situation, the upper input to gate 5-9 is H from the output of gate 2-13, the middle input to gate 5-9 is H from the output of gate 1-13 due to the L on input lead B, and the bottom input to gate 5-9 is L from the L output 1 of FF 4B.

If, as previously described, the signal level on the input leads A and B returns to zero level, as in the case of time segment T3 of one of the initial seven transmission time slots, the outputs of gates 5-7 and 5-9 will remain H because lead A would stay H while lead B would go L to H.

If, on the other hand, a reversal of the condition of leads A and B occurs at the beginning of the transponder's receive time segment T3, that one of gates 5-7 and 5-9 which has one of its inputs H from one of FF 4A and FF 4B will provide a H to L transition at its output.

In the assumed situation, gate 5-7 has its middle input H from the 1 output of FF 4A. When the format violation occurs, by respective input leads A and B going H to L and L to H, the output of gate 1-7 on the clear rail will not go H to L, as in the case of time segments T3 of the initial transmission time slots, but will be held H for the time being due to the H to L on input lead A and due to the H to L from the output of gate 13-3 due to the L to H output from gate 1-3. The H to L output of gate 1-13 causes the output of gate 2-5 to go L to H which is reflected through gates 11-7 and 11-9 as a L to H on the SHIFT lead into FIG. 9. In the meantime, the L to H output of gate 1-3 at the upper input to gate 5-7 causes the latter to produce a H to L at its output at the upper input to gate 5-3 and at the set input S1 of FF D. FF D thus becomes set with its 0 output L and its 1 output H. Also, the L to H output of gate 5-3 is reflected through gate 3-9 as a H to L at the set input S of FF E so that FF E becomes set with its output 0 at L. The L from the 0 outputs of FF D and FF E are reflected respectively through gates EOTP and EOTR as L to H on each of leads EOTP and EOTR into FIG. 9. In the output circuit of FIG. 9, the L to H on leads EOTP and EOTR causes a H to L output from gate G4 at the set input S of FF EOT so that FF EOT becomes set with its output 1 at H to extinguish LED LEOTP to indicate that the transponder is again at an idle state.

In the meantime, the L to H at the output 1 of FF D in FIG. 12 causes a H to L at the output of gate 7-5. The H to L from gate 7-5 is reflected through gate 3-7 as a L to H at the lower inputs to gates 3-13 and 3-3. The resulting H to L from gate 3-3 at the set input S of FF 4A has no effect since FF 4A is already in a set condition (output 1 at H and output 0 at L).

However, the H to L output of gate 7-5 appears at the reset inputs R of FF 10M and FF 10S and at the lower inputs of gates 15-11, 15-3 and 8-3. The H to L on the lower input to gate 15-3 causes lead C to return from L to H toward the data loop of FIG. 10. Thus, with lead D remaining H from the output of gate 15-11, leads C and D are both H to provide to the data loop a change back to the zero level signal as the return signal back toward the transceiver. The H to L at the reset inputs R of FF 10M and FF 10S causes 10M to be reset (output 0 at H and output 1 at L) and leaves FF 10S in its reset condition (output 0 at H and output 1 at L). In the meantime, the H to L at the lower input to gate 8-3 causes the output of gate 8-3 to go L to H to cause the output of gate 9-9 to go H to L to disable gates 9-3 and 9-13. The output of gate 9-7 will have gone H to L in the meantime at the reset input R of FF C to cause the latter to be reset so that its output 0 goes L to H, which is reflected through gate 2-13 as a H to L at the upper input to gate 5-9 and at the lower input to gate 5-7. The output of gate 5-7 thus goes back to H, the output of gate 5-3 returns to L, and the output of gate 3-9 returns to H.

When the input leads A and B in FIG. 12 indicate the end of the time segment T3 of the last transmission time slot from the transceiver of FIG. 11 by way of the data loop of FIG. 10, lead A will return L to H with lead B remaining H, thus to represent a change back to the zero level signal from the data loop. The L to H on lead A causes the output of gate 1-3 to go H to L to in turn allow the outputs of gates 13-3 and 13-13 to go L to H such that the output of gate 1-7 goes H to L on the clear rail at the reset inputs R of FF 4A and FF 4B. FF 4B is already reset with its output 0 at H and its output 1 at L. FF 4A is reset so that its respective outputs 1 and 0 go H to L and L to H. The H to L from output 1 of FF 4A causes lead M to be L into FIG. 9. The L to H from the 0 output of FF 4A causes the output of gate 7-3 to remain L. Also, the L to H from the 0 output of FF 4A causes the output of gate 5-13 to go H to L at the reset input R of FF D so that the respective outputs 0 and 1 of FF D become L to H and H to L. The L to H output 0 of FF D appears as a H to L from the output of gate EOTP on lead EOTP into FIG. 9 to return to H the output of gate G4 at the set input S of FF EOT in FIG. 9. As the result of the foregoing, the transponder of FIG. 12 is returned to its idle condition.

If, as previously described in connection with the transceiver, the preferred situation is not used, so that a violation of the signal format does not occur during time segment T3 of the last transmission time slot from the transceiver, then the transponder will end up (after it receives the change back to the zero level signal for the last time segment T3) in the same condition as it did for any one of the initial time segments T3. In particular, leads EOTP and EOTR will remain L from FIG. 12 into the output circuit of FIG. 9; and, as a consequence, the FF EOT in FIG. 9 will remain reset with its output 1 at L to cause LED LEOTP to remain lighted to signify a busy transponder. In other words, the transponder will wait for and will expect more transmissions from the data loop.

The functioning of the transponder of FIG. 12, when the double-level signal format of FIG. 3 is used, will be discussed later in connection with descriptions of the functioning of the modulator and demodulator of FIGS. 13 and 14.

DOUBLE-LEVEL SIGNAL FORMAT

As has been described above in connection with FIG. 3, the double-level bipolar return-to-zero signal format may be used to represent a group of items of information consisting of double-digit binary numbers such as 00, 01, 10 and 11 where the polarity of the signal change during time segment T1 represents the value of the left-hand digit and where the level toward which the signal changes during time segment T1 represents the value of the right-hand digit.

In order to use the double-level signal format of FIG. 3 for transmission, each of the transceiver of FIG. 11 and the transponder of FIG. 12 will be provided with a modulator MOD according to FIG. 13 and with a demodulator DEMOD according to FIG. 14, both connected to the other circuits according to FIG. 14.

In the transceiver of FIG. 11, switches MOD and DEM will be closed so that the control signals supplied over lead SHIFT from FIG. 11 into the input circuit of FIG. 8 are also supplied over lead SHIFT(1) from FIG. 11 into the transceiver modulator MOD of FIG. 13 and so that the control signals supplied to the reset inputs to FF 11M and FF 11S are also supplied over lead CLB1 from FIG. 11 into the transceiver demodulator DEMOD of FIG. 14.

In the transponder of FIG. 12, switches DEM and MOD will be closed so that the control signals on the clear rail from the output of gate 1-7 are supplied over lead CLB2 from FIG. 12 into the transponder demodulator DEMOD of FIG. 14 and so that the control signals supplied over lead SHIFT from FIG. 12 into the output circuit of FIG. 9 are also supplied over lead SHIFT(2) into the transponder modulator MOD of FIG. 13.

In the data loop of FIG. 10, switches MOD1, MOD2 and DEM1 through DEM4 will be closed so that the transceiver modulator MOD of FIG. 13 can control the level of the transceiver transmit signal by means of lead MOD1 from FIG. 13 into FIG. 10, so that the transponder modulator MOD of FIG. 13 can control the level of the transponder return signal by means of lead MOD2 from FIG. 13 into FIG. 10, so that the transponder demodulator DEMOD of FIG. 14 can be controlled according to the level of the transceiver transmit signal by means of leads DEM3 and DEM4 from FIG. 10 into FIG. 14, and so that the transceiver demodulator DEMOD of FIG. 14 can be controlled according to the level of the transponder return signal by means of leads DEM1 and DEM2 from FIG. 10 into FIG. 14.

Regarding the use of FIG. 10 of either of the delay lines ADL and PDL, instead of the transponder, to supply return signals to the transceiver, it will be seen from later description that the transponder nevertheless will need to use a modulator and a demodulator; however, in FIG. 10, at least the switches RS4 and RM4 will be opened since it is not necessary for the transponder to supply return signals to the data loop.

MODULATOR

In order for the transceiver to be able to transmit double-digit numbers to the data loop, a modulator MOD of FIG. 13 must be used in connection with the input circuit of FIG. 8. The input circuit of FIG. 8 will be set up, as in the case of single-digit numbers, to specify the value 0 or 1, of the left-hand digit so that lead D1 from FIG. 8 into FIG. 11 will cause the transceiver to transmit over leads TM and TS into the data loop of FIG. 10 the corresponding polarity change of signal level. The shift register SR1 of the MOD of FIG. 13 will be set up to specify the value of the right-hand digit so that lead MOD1 from FIG. 13 into FIG. 10 will adjust the level of the signal change being transmitted on leads TM and TS from the transceiver. For instance, using the example shown in FIG. 3, if the group of double-digit numbers to be transmitted by the transceiver is (10)(01)(00)—(11), the SR1 of FIG. 8 will be set up so that lead D1 into FIG. 11 is successively H (=1), L (=0) and L (=0) to specify the values of the left-hand digits of the initial three numbers and is H (=1) to specify the value of the left-hand digit of the last number. Also, the SR1 of FIG. 13 will be set up so that output D1 of SR1 is successively L (=0), H (=1) and L (=0) to specify the values of the right-hand digits of the initial three numbers and is H (=1) to specify the value of the right-hand digit of the last number.

In FIG. 13, if output D1 of SR1 is L to specify a right-hand digit of 0, transistor T will be in the OFF condition and lead MOD1 from FIG. 13 into FIG. 10 will be unconnected. Under this situation in FIG. 10, if the left-hand digit is a 1 (lead TM at L and lead TS at H), current flows in an assumed positive (+) direction through the upper left winding of transformer T1; and, resistance R1 is of such a value as to cause a unit level of positive current (+1) during time segment T1 in FIG. 3. The positive polarity (specified by lead TM at L and leads TS at H) is determined by the left-hand binary digit of 1. The unit level of current (specified by lead MOD1 in an unconnected condition) is determined by the right-hand binary digit of 0. On the other hand, if the left-hand digit is a 0 (lead TM at H and lead TS at L), current flows in an assumed negative (−) direction through the lower left winding of transformer T1; and, resistance R1 limits that current to a unit level of negative current (−1) during time segment T1 in FIG. 3. The negative polarity (specified by lead TM at H and lead TS at L) is determined by the left-hand binary digit of 0. Again, the unit level of current (specified by lead MOD1 in an unconnected condition) is determined by the right-hand binary digit of 0.

In FIG. 13, if output D1 of SR1 is H to specify a right-hand digit of 1, then transistor T will be in the ON condition and lead MOD1 in FIG. 13 will be returned through resistance R7 in FIG. 13 at the ON transistor T1 to positive 5 volts. In the latter situation in FIG. 10, it is thus seen that the current supply for the primary winding (left) of transformer T1 is in effect the parallel connected resistances R1 of FIG. 10 and R7 of FIG. 13. It is assumed that the values of R1 and R7 are such that the present situation causes about double the amount of current in that direction (+ or −) in the left upper or lower winding of transformer T1 specified by the polarity condition on leads TM and TS. Thus, a right-hand digit of 1 will cause a double unit level of current in the data loop.

It will be apparent, from previous description of the functioning of the transceiver of FIG. 11, that when a H to L shift signal is supplied by the transceiver to the input circuit of FIG. 8 on the SHIFT lead, the same signal is supplied by the transceiver to the MOD of FIG. 13 on the SHIFT(1) lead. The latter situation keeps the shift registers SR1 of FIGS. 8 and 13 in step throughout transmission of all of the double-digit binary numbers.

In the same manner, the transponder of FIG. 12 will use a MOD of FIG. 13 to provide return signals into the data loop of FIG. 10 at the primary (right) windings of transformer T3. In this regard, the transponder of FIG. 12 will supply a shift signal on lead SHIFT(2) into the transponder MOD of FIG. 13 to keep the MOD of FIG. 13 in step with the output circuit of FIG. 9.

In FIG. 3, the signal format violation of the transceiver transmit current situation during time segment T3 of the last transceiver transmission time slot is shown in dotted lines as either +1 or +2 even though the value signal during time segment T1 was +2. This uncertainty is due to the fact that the last shift occurs in the shift registers SR1 of FIGS. 8 and 13 at about the end of time segment T1 such that when time segment T3 occurs outputs D1 of the shift registers SR1 of FIGS. 8 and 13 will be H or L according to the first return signal previously received from the transponder by way of the data loop of FIG. 10. Thus, the single or double unit of signal level during time segment T3 is uncertain; however, the polarity of that signal was remembered by the transceiver so that the polarity of the signal level during time segment T3 will be the same as that during time segment T1, the actual signal level of one or two units not being of consequence.

As will be seen later during description of the DEMOD of FIG. 14, lead M2 from the DEMOD into the MOD of FIG. 13 supplies to shift register SR1 of FIG. 13 the values of the right-hand digits of the signals.

Also, as will be seen later, in FIG. 10, if a delay line ADL or PDL is being used, instead of the transponder of FIG. 12, to supply return signals to the transceiver of FIG. 11, the transceiver DEMOD will of course be demodulating representations of the signals transmitted by the transceiver. Again, the actual level of the transceiver transmit signal change during the last time segment T3 will be uncertain since it will depend upon the first return signal level change stored in the shift registers of FIGS. 8 and 13.

DEMODULATOR

In the demodulator DEMOD of FIG. 14, FF M is normally reset so that its output 1 is normally L on lead M2 into the companion modulator MOD of FIG. 13. Thus, the value of the right-hand binary digit of the number (that is either 00, 01, 10 or 11) to be inserted into the shift register SR1 of FIG. 13 will be L (=0) unless FF M of FIG. 14 becomes set so that its output 1 on lead M2 is H (=1).

FF M of FIG. 14 is reset with its output 1 at L onto lead M2 whenever a H to L transition appears on either lead CLB1 or lead CLB2 at the reset input R of FF M. Such a H to L signal is supplied over lead CLB1 from the transceiver of FIG. 11 to the transceiver DEMOD of FIG. 14; and, such a H to L signal is supplied over lead CLB2 from the transponder of FIG. 12 to the transponder DEMOD of FIG. 14.

In the transponder DEMOD of FIG. 14, the input leads DEM3 and DEM4 extend from the data loop of FIG. 10 from the secondary winding (right) of transformer T2 and the input leads DEM1 and DEM2 in FIG. 14 are left unconnected. Leads DEM3 and DEM4 will thus provide to the Zener diodes Z13 and Z24 of the transponder DEMOD one of a signal either of a single unit level or of a double unit level at one polarity (+1 or +2), a signal either of a single unit level or of a double unit level at the other polarity (−1 or −2), and a zero signal level all according to the transceiver transmit signal change received at the trasponder end of the data loop of FIG. 10.

Similarly, in the transceiver DEMOD of FIG. 14, the input leads DEM1 and DEM2 extend from the data loop of FIG. 10 from the secondary winding (left) of transformer T2 and the input leads DEM3 and DEM4 in FIG. 14 are left unconnected. Thus, leads DEM1 and DEM2 supply to the transceiver DEMOD one of the above signal levels according to the transponder return signal received at the transceiver end of the data loop of FIG. 10.

Also, as has been discussed in connection with the data loop of FIG. 10, if one-way transmission is used, then one of the delay lines ADL and PDL will supply return signals to the transceiver. In the case of the passive delay line PDL, the transceiver DEMOD of FIG. 14 will be controlled over leads DEM1 and DEM2. In the case of the active delay line ADL, only the polarity (that is, the condition of leads TM and TS in FIG. 10) of the transmitted signal level change is returned to the transceiver over leads RM and RS; so, no demodulation of the transmitted signal level of either a single unit level or a double unit level is necessary.

Whenever a particular polarity of signal appears in FIG. 14 between either leads DEM1 and DEM2 or leads DEM3 and DEM4, with the other pair of leads left unconnected, the level of that signal either will be large enough (that is, a double unit level) to cause conduction through one of diodes Z13 and Z24 or will be small enough (that is, a single unit level) to prevent conduction through either of diodes Z13 and Z24. If the signal is at a single unit level, thus representing a right-hand binary digit of 0, FF M will remain reset with its output 1 at L on lead M2 into the companion MOD of FIG. 13. On the other hand, if the signal is at a double unit level, thus representing a right-hand binary digit of 1, conduction through one of diodes Z13 and Z24 will cause a H to L pulse to occur at the set input S of FF M to cause its output 1 to go to H on lead M2 into the companion MOD of FIG. 13.

In the transponder DEMOD of FIG. 14, the reset input R of FM M will receive a H to L over lead CLB2 from the transponder of FIG. 12 every time that the clear rail at the output of gate 1-7 goes H to L in FIG. 12. The latter occurs at the end of time segment T2 of each initial transceiver transmission time slot, as detected on input leads A and B of FIG. 12, when both of leads A and B become H according to the change back to the zero level signal during time segment T3. Each of these H to L transitions from gate 1-7 of FIG. 12 thus resets FF M of FIG. 14 so the FF M can be responsive to the value signal during the next time segment T1 so that lead M2 from FIG. 14 into the companion MOD of FIG. 13 can be adjusted to H or left at L according to the value of the next receieved item. As will be recalled, the H or L on lead M2 into FIG. 13 will be shifted into the Q8 output of SR1 of FIG. 13 when the H to L shift signal appears on lead SHIFT(2) in FIG. 13.

During the reception by the transponder of the last transceiver transmission time slot, if the preferred signal format is being used where the last time segment T3 is a change to a signal level other than zero, the output of gate 1-7 in FIG. 12 will not provide a H to L on lead CLB2 into the transponder DEMOD of FIG. 14 until the end of time segment T3 of the last received transceiver transmission time slot.

In the transceiver DEMOD of FIG. 14, the reset input R of FM M will receive a H to L over lead CLB1 from the transceiver of FIG. 11 every time that the output of gate 5-3 goes H to L in FIG. 11. The latter occurs just before the beginning of time segment T1 of each transceiver transmission slot. Each such H to L on lead CLB1 into the transceiver DEMOD of FIG. 14 thus resets FF M of FIG. 14 so that FF M can be responsive to the value signal received by the transceiver after the loop delay LD near the end of time segment T1 of the transceiver transmission time slot, as shown in FIG. 3. As will be recalled, the H or L on lead M2 into FIG. 13 will be shifted into the Q8 output of SR1 in FIG. 13 when the H to L shift signal appears on lead SHIFT(1) in FIG. 13.

It is to be understood that the above-described arrangements are illustrative of the application of the principles of the invention. Other arrangements may be devised by those skilled in the art without departing from the spirit and scope of the invention. For example, the actual magnitude of signal level change employed during time segment T1 to represent the item value of a particular binary number is not necessarily required to be of the same magnitude for time segment T1 for the item value of another number even if the same number values are involved. However, for purposes of reducing the tendency toward center-line-drift, it is desirable that the energy of the signal during time segment T1 of a particular transmission time slot be effectively canceled by the energy of the signal during time segment T2 of the same time slot. Also, while the examples of groups of binary numbers in the detailed description have been limited to groups of eight numbers where each number is either a single binary digit or a set of two binary digits, it will be obvious that more or less than eight numbers may constitute a group and that more than two binary digits may constitute a number of a group. In the latter regard, the modulator and demodulator may be modified to accommodate the number of signal levels required to provide sufficient level changes to represent the multidigit numbers. In addition, whereas the time segments T1, T2 and T3 of a particular transmission time slot have been disclosed by example as being of substantially equal duration, it will be apparent that such time durations may vary within a particular transmission time slot and may vary from time slot to time slot. In the latter regard, where reduction of the tendency toward center-line-drift is of significant concern, it is desirable, as above mentioned, that the energy of time segment T1 signals be effectively canceled by the energy of the adjacent time segment T2 signals. The foregoing examples and suggestions are not intended as constituting an exhaustive list.

I claim:

1. The method of transmitting an item of binary information where the item is represented by the occurrence of a plurality of direct current signals during a transmission time slot for the time CHARACTERIZED BY transmitting only three successive signals during the transmission time slot where the first signal represents the binary value of the item, the second signal represents a transition between the first signal and the third signal, and the third signal represents the end of the transmission time slot for the item.

2. The invention defined in claim 1 FURTHER CHARACTERIZED IN THAT
   (A) each signal is a change between different signal levels of a plural level signal format,
   (B) the first signal is a value signal which represents the binary value of the item,
   (C) the second signal is different from the first signal,
   (D) and the third signal is different from the second signal.

3. The invention defined in claim 2 FURTHER CHARACTERIZED IN THAT
   (A) each value signal has a different signal for its correlate signal
   (B) and the second signal is the correlate signal for the value signal.

4. The invention defined in claim 3 FURTHER CHARACTERIZED IN THAT the plural level signal format comprises
   (A) a zero signal level
   (B) and at least one finite signal level of each of two opposite polarities with respect to the zero signal level.

5. The invention defined in claim 4 FURTHER CHARACTERIZED IN THAT
   (A) the value signal is a change from zero level to a finite level of one of the two opposite polarities
   (B) and the correlate signal for the value signal is a change from the finite level of the one polarity to a finite level of the other polarity.

6. The invention defined in claim 5 FURTHER CHARACTERIZED IN THAT
   (A) the binary value of the item is one of $2^n$ n-digit binary numbers,
   (B) the value signal for each different one of one-half of the $2^n$ numbers is a change to a different one of $2^{n-1}$ finite signal levels of the one polarity,
   (C) and the value signal for each different one of the other half of the $2^n$ numbers is a change to a different one of $2^{n-1}$ finite signal levels of the other polarity.

7. The invention defined in claim 6 FURTHER CHARACTERIZED IN THAT
   (A) n is equal to 1 so that the binary value of the item is one of the two single binary digit numbers of 1 and 0,
   (B) the value signal for the binary digit of 1 is a change to the single finite signal level of the one polarity,
   (C) and the value signal for the binary digit of 0 is a change to the single finite signal level of the other polarity.

8. The invention defined in claim 7 FURTHER CHARACTERIZED IN THAT
   (A) the two single finite signal levels of opposite polarity are otherwise equal finite signal levels
   (B) and the polarity of the value signal represents the binary value of the item.

9. The invention defined in claim 6 FURTHER CHARACTERIZED IN THAT
   (A) n is equal to 2 so that the binary value of the item is one of the four double binary digit numbers of 00 and 01 and 10 and 11,
   (B) the value signals for respective ones of one pair of numbers are changes to the two different respective finite signal levels of the one polarity,
   (C) and the value signals for respective ones of the other pair of numbers are changes to the two different respective finite signal levels of the other polarity.

10. The invention defined in claim 9 FURTHER CHARACTERIZED IN THAT
    (A) the value signals for the pair of numbers 00 and 01 are changes to the two different finite signal levels of the one polarity,
    (B) the value signals for the pair of numbers 10 and 11 are changes to the two different finite signal levels of the other polarity,
    (C) the polarity of the value signal represents the left-hand binary digit of the pair,
    (D) and the changes to the two different finite signal levels of either polarity represent the two different ones of the right-hand binary digits of the pair.

11. The invention defined in claim 10 FURTHER CHARACTERIZED IN THAT
    (A) the correlate signals for the respective value signals for the two numbers 00 and 10 are changes from the two respective finite signal levels of the one polarity to the two respective finite signal levels of the other polarity
    (B) and the correlate signals for the respective value signals for the two numbers 01 and 11 are changes from the two respective finite signal levels of the other polarity to the two respective finite signal levels of the one polarity.

12. The invention defined in claim 11 FURTHER CHARACTERIZED IN THAT
    (A) the two different finite signal levels of the one polarity are otherwise equal to the respective two different finite signal levels of the other polarity
    (B) and the correlate signal for a particular value signal is a change from a particular finite signal level of a particular polarity to the equal finite signal level of the other polarity.

13. The method of transmitting a group of items of binary information where each item is represented by the occurrence of a plurality of direct current signals during a transmission time slot for the item and where the group consists of at least one initial item and a last item CHARACTERIZED BY transmitting only three successive signals during the transmission time slot for each item where the first signal represents the binary value of the item, the second signal represents a transition between the first signal and the third signal, the third signal represents the end of the transmission time slot for the item, and the third signal also distinguishes the end of the transmission time slot for an initial item from the end of the transmission time slot for the last item.

14. The invention defined in claim 13 FURTHER CHARACTERIZED IN THAT
(A) each signal is a change between different signal levels of a plural level signal format,
(B) the first signal for each item is a value signal which represents the binary value of the item,
(C) the second signal for each item is different from the first signal for the item,
(D) and the third signal for each item is different from the second signal for the item.

15. The invention defined in claim 14 FURTHER CHARACTERIZED IN THAT
(A) each value signal has a different signal for its correlate signal
(B) and the second signal for each item is the correlate signal for the value signal for the item.

16. The invention defined in claim 15 FURTHER CHARACTERIZED IN THAT
(A) the third signal for an initial item is a special signal different from all other signals for the item
(B) and the third signal for the last item is a signal other than the special signal.

17. The invention defined in claim 16 FURTHER CHARACTERIZED IN THAT the signal format comprises
(A) a zero signal level
(B) and at least one finite signal level of each of two opposite polarities with respect to the zero signal level.

18. The invention defined in claim 17 FURTHER CHARACTERIZED IN THAT
(A) the value signal for a particular item is a change from zero level to a particular finite level of one of the two opposite polarities
(B) and the correlate signal for the value signal is a change from the particular finite level of the one polarity to a particular finite level of the other polarity.

19. The invention defined in claim 18 FURTHER CHARACTERIZED IN THAT
(A) the third signal for an initial item is a change from the particular finite level of the other polarity to the zero signal level
(B) and the third signal for the last item is a change from the particular finite level of the other polarity to a finite level of the one polarity.

20. The invention defined in claim 19 FURTHER CHARACTERIZED IN THAT
(A) the binary value of each item is one of $2^n$ n-digit binary numbers,
(B) the value signal for each different one of one-half of the $2^n$ numbers is a change to a different one of $2^{n-1}$ finite signal levels of the one polarity,
(C) and the value signal for each different one of the other half of the $2^n$ numbers is a change to a different one of $2^{n-1}$ finite signal levels of the other polarity.

21. The invention defined in claim 20 FURTHER CHARACTERIZED IN THAT
(A) n is equal to 1 so that the binary value of each item is one of the two single binary digit numbers of 1 and 0,
(B) the value signal for the binary digit of 1 is a change to the single finite signal level of the one polarity,
(C) and the value signal for the binary digit of 0 is a change to the single finite signal level of the other polarity.

22. The invention defined in claim 21 FURTHER CHARACTERIZED IN THAT
(A) the two single finite signal levels of opposite polarity are otherwise equal finite signal levels
(B) and the polarity of the value signal represents the binary value of the item.

23. The invention defined in claim 22 FURTHER CHARACTERIZED IN THAT the third signal for the last item is a change from the single finite level of the other polarity to the single finite level of the one polarity.

24. The invention defined in claim 20 FURTHER CHARACTERIZED IN THAT
(A) n is equal to 2 so that the binary value of each item is one of the four double binary digit numbers of 00 and 01 and 10 and 11,
(B) the value signals for respective ones of one pair of numbers are changes to the two different respective finite signal levels of the one polarity,
(C) and the value signals for respective ones of the other pair of numbers are changes to the two different respective finite signal levels of the other polarity.

25. The invention defined in claim 24 FURTHER CHARACTERIZED IN THAT
(A) the value signals for the pair of numbers 00 and 01 are changes to the two different finite signal levels of the one polarity,
(B) the value signals for the pair of numbers 10 and 11 are changes to the two different finite signal levels of the other polarity,
(C) the polarity of the value signal represents the left-hand binary digit of the pair,
(D) and the changes to the two different finite signal levels of either polarity represent the two different ones of the right-hand binary digits of the pair.

26. The invention defined in claim 25 FURTHER CHARACTERIZED IN THAT
(A) the correlate signals for the respective value signals for the two numbers 00 and 10 are changes from the two respective finite signal levels of the one polarity to the two respective finite signal levels of the other polarity
(B) and the correlate signals for the respective value signals for the two numbers 01 and 11 are changes from the two respective finite signal levels of the other polarity to the two respective finite signal levels of the one polarity.

27. The invention defined in claim 26 FURTHER CHARACTERIZED IN THAT
(A) the two different finite signal levels of the one polarity are otherwise equal to the respective two different finite signal levels of the other polarity
(B) and the correlate signal for a particular value signal is a change from a particular finite signal level of a particular polarity to the equal finite signal level of the other polarity.

28. The invention defined in claim 27 FURTHER CHARACTERIZED IN THAT the third signal for the last item is a change from one of the two finite signal levels of the other polarity to one of the two finite signal levels of the one polarity.

* * * * *